United States Patent
Tamura et al.

(10) Patent No.: US 11,654,645 B2
(45) Date of Patent: May 23, 2023

(54) FRICTION TRANSMISSION BELT AND METHOD FOR PRODUCING SAME

(71) Applicant: Mitsuboshi Belting Ltd., Kobe (JP)

(72) Inventors: Takafumi Tamura, Hyogo (JP); Hiroki Takechi, Hyogo (JP); Arata Hasegawa, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 798 days.

(21) Appl. No.: 16/496,314

(22) PCT Filed: Mar. 20, 2018

(86) PCT No.: PCT/JP2018/011189
§ 371 (c)(1),
(2) Date: Sep. 20, 2019

(87) PCT Pub. No.: WO2018/174093
PCT Pub. Date: Sep. 27, 2018

(65) Prior Publication Data
US 2020/0009813 A1 Jan. 9, 2020

(30) Foreign Application Priority Data
Mar. 21, 2017 (JP) .............................. JP2017-054859
Mar. 7, 2018 (JP) .............................. JP2018-041186

(51) Int. Cl.
*B29D 29/08* (2006.01)
*B32B 23/02* (2006.01)
(Continued)

(52) U.S. Cl.
CPC ................ *B29D 29/08* (2013.01); *B32B 5/24* (2013.01); *B32B 5/266* (2021.05); *B32B 23/02* (2013.01);
(Continued)

(58) Field of Classification Search
CPC ..... B29C 43/10; B29C 43/102; B29C 43/104; B29C 43/12; B29C 2043/3205;
(Continued)

(56) References Cited

U.S. PATENT DOCUMENTS 4,265,627 A * 5/1981 Imamura .................... F16G 5/08
474/267
6,443,866 B1 * 9/2002 Billups ...................... F16G 1/28
474/263
(Continued)

FOREIGN PATENT DOCUMENTS

| CN | 101160478 A | 4/2008 |
| CN | 105992891 A | 10/2016 |

(Continued)

OTHER PUBLICATIONS

Oct. 16, 2018—(TW) Office Action—App 107109661.
(Continued)

*Primary Examiner* — Michael A Tolin
(74) *Attorney, Agent, or Firm* — Banner & Witcoff, Ltd.

(57) ABSTRACT

A frictional power transmission belt includes a tension layer forming a belt back surface, a compression rubber layer to be in contact with a pulley and frictionally engaged with the pulley, and a tension member embedded between the tension layer and the compression rubber layer along a belt length direction. The compression rubber layer has a surface to be in contact with the pulley. At least a part of the surface is coated with a fiber layer via a fiber/resin mixture layer. The fiber/resin mixture layer contains a resin component and heat-resistant fibers having a softening point or a melting point higher than a vulcanization temperature of a rubber forming the compression rubber layer. The fiber layer contains hydrophilic heat-resistant fibers having a softening
(Continued)

point or a melting point higher than the vulcanization temperature and does not contain a resin component.

2 Claims, 6 Drawing Sheets

(51) Int. Cl.
*B32B 5/26* (2006.01)
*B32B 5/24* (2006.01)
*F16G 1/08* (2006.01)
*F16G 5/20* (2006.01)
*B29L 31/00* (2006.01)

(52) U.S. Cl.
CPC ... *B29K 2023/06* (2013.01); *B29L 2031/7094* (2013.01); *B32B 2433/04* (2013.01); *F16G 1/08* (2013.01); *F16G 5/20* (2013.01)

(58) Field of Classification Search
CPC .... B29C 2043/3222; B29C 2043/3227; B29C 2043/3233; B29D 29/08; B29D 29/10; B29D 29/106; B29K 2023/06; B29L 2031/7094; B32B 3/263; B32B 5/022; B32B 5/024; B32B 5/08; B32B 5/24; B32B 5/26; B32B 5/265; B32B 5/266; B32B 5/271; B32B 7/12; B32B 23/02; B32B 25/10; B32B 25/12; B32B 25/14; B32B 25/16; B32B 25/20; B32B 2260/021; B32B 2260/046; B32B 2262/0223; B32B 2262/0246; B32B 2262/0253; B32B 2262/0261; B32B 2262/0269; B32B 2262/0284; B32B 2262/04; B32B 2262/062; B32B 2262/065; B32B 2262/08; B32B 2262/101; B32B 2262/106; B32B 2262/14; B32B 2307/102; B32B 2307/306; B32B 2307/546; B32B 2307/726; B32B 2307/728; B32B 2307/732; B32B 2413/00; B32B 2433/00; B32B 2433/04; F16G 1/08; F16G 1/10; F16G 1/12; F16G 1/16; F16G 1/21; F16G 1/28; F16G 5/06; F16G 5/08; F16G 5/10; F16G 5/14; F16G 5/20; F16G 5/22
See application file for complete search history.

(56) References Cited

U.S. PATENT DOCUMENTS

| | | |
|---|---|---|
| 2009/0081473 A1 | 3/2009 | Ohno |
| 2010/0075793 A1 | 3/2010 | Cretin et al. |
| 2012/0058849 A1 | 3/2012 | Yoshida |
| 2015/0285335 A1 | 10/2015 | Mitsutomi et al. |
| 2017/0009847 A1 | 1/2017 | Mitsutomi et al. |
| 2017/0241512 A1 | 8/2017 | Mitsutomi et al. |

FOREIGN PATENT DOCUMENTS

| | | |
|---|---|---|
| JP | 2003202055 A | 7/2003 |
| JP | 2010-101489 A | 5/2010 |
| JP | 2010242825 A | 10/2010 |
| JP | 2014-111981 A | 6/2014 |
| WO | 2010134289 A1 | 11/2010 |

OTHER PUBLICATIONS

Jun. 19, 2018—International Search Report—Intl App PCT/JP2018/011189.
Jun. 19, 2018—(WO) Written Opinion of ISA—Intl App PCT/JP2018/011189.
Jun. 9, 2020—(JP) Decision of Refusal—App 2018-041186—Eng Translation.
Mar. 17, 2020—(JP) Notification of Reasons for Refusal—App 2018-041186—Eng Translation.
Jul. 28, 2020—(CN) First Office Action—App No. 201880019040.7—English Translation.
Dec. 18, 2020—(EP) European Search Report—App 18770304.6.

\* cited by examiner

VICINITY OF SURFACE OF
COMPRESSION LAYER
FIBER/RESIN MIXTURE LAYER
HYDROPHILIC HEAT-RESISTANT FIBER LAYER

FRICTION TRANSMISSION BELT AND METHOD FOR PRODUCING SAME

CROSS REFERENCE TO RELATED APPLICATIONS

This is a U.S. National Phase Application under 35 U.S.C. § 371 of International Application No. PCT/JP2018/011189, filed Mar. 20, 2018, which claims priority to Japanese Application Nos. 2017-054859, filed Mar. 21, 2017 and 2018-041186, filed Mar. 7, 2018, which was published Under PCT Article 21(2), the entire contents of which are incorporated herein by reference.

TECHNICAL FIELD

The present invention relates to a frictional power transmission belt for use for driving automobile engine auxiliary machines and to a method for producing the same, and in detail, it relates to a V-ribbed belt that prevents noise in pouring water, and to a method for producing the same.

BACKGROUND ART

In the field of rubber industry, automobile components are desired to have advanced function and performance. Rubber products for use for such automobile components include transmission belts and they are widely used, for example, for power transmission of auxiliary drive of automobile air compressors, alternators, etc. In recent years, a severe requirement for silencing is increasing, and in particular, in automobile driving devices, any other sound than engine sound is regarded as a noise, and therefore, a countermeasure to noise generation in belts is demanded.

Patent Literature 1 discloses a transmission belt having elastomer teeth of an ethylene-α-olefin elastomer each covered with a barrier layer of a thermoplastic material, in which the barrier layer is covered with an outer cover formed of a woven or nonwoven fabric and the outer side cover on at least the flank of the elastomer teeth is partially included in a part of the thickness of the barrier layer. This literature describes that the barrier layer prevents the teeth rubber (raw material constituting the elastomer teeth) from passing through the cover on the outer side during belt formation and the cover on the outer side (fibers or yarns) is partially embedded inside a part of the thickness of the barrier layer to thereby improve the cracking resistance of the barrier layer and, in addition, the remaining part that is not embedded is protruded out (exposed out) on the side of pulleys to thereby prevent noise generation. Further, it is disclosed that the barrier layer and the cover on the outer side are previously integrated through calendering and rolling, and the nonwoven fabric constituting the cover on the outer side penetrates into the film constituting the barrier layer only partially and can be therefore absolutely prevented from penetrating into the teeth rubber that changes from the raw state to a vulcanized state. In addition, the literature further discloses that, as the woven or nonwoven fabric to form the cover on the outer side, especially suitable is a polyethylene-based woven or nonwoven fabric.

However, in this drive belt, the cover on the outer side is merely embedded only partially inside a part of the thickness of the barrier layer, and with the progress of wear along with belt running, only the barrier layer with no cover on the outer side thereon is to be soon exposed out, and therefore there is also a risk of reduction in the cracking resistance and the wear resistance of the barrier layer. In that situation, in addition, since the barrier layer is not reinforced with a cover on the outer side, the barrier layer would peel off from the surface of the elastomer teeth due to shearing from pulleys or there may be a probability that the barrier layer would break in the inside thereof. Further, though the drive belt uses a peroxide for curing the teeth rubber or any other chemical having curability to thereby promote the bonding between the teeth and the barrier layer, it could not be said that only the chemical action would be sufficient for preventing the barrier layer from peeling off and, in addition, this is not effective against the destruction inside the barrier layer.

On the other hand, as a frictional power transmission belt capable of improving noise resistance and wear resistance, Patent Literature 2 discloses a frictional power transmission belt containing a tension layer forming a belt back surface, a compression rubber layer formed on one surface of the tension layer and frictionally engaging at the lateral surface thereof with pulleys, and a tension member embedded between the tension layer and the compression rubber layer along the belt length direction, in which a surface of at least a part of the compression rubber layer to be in contact with pulleys is coated with a fiber/resin mixture layer that contains a resin component and heat-resistant fibers having a softening point or a melting point higher than a vulcanization temperature in a mixed state, and the heat-resistant fibers contain a fiber embedded so as to extend from the fiber/resin mixture layer to the compression rubber layer.

However, depending on the conditions of use and the length of the period of use, this frictional power transmission belt is not sufficient for meeting severe demand for quietness in the automobile industry in recent years, and in particular does not have sufficient noise resistance in pouring water in an actual vehicle.

CITATION LIST

Patent Literature

Patent Literature 1: JP-A-2010-101489
Patent Literature 2: JP-A-2014-111981

SUMMARY OF INVENTION

Technical Problem

Therefore, an object of the present invention is to provide a frictional power transmission belt capable of improving noise suppression in pouring water, and a method for producing the same.

Another object of the present invention is to provide a frictional power transmission belt capable of improving noise suppression and wear resistance during a long period, and a method for producing the same.

Solution to Problem

The present inventors have assiduously studied for the purpose of attaining the above-mentioned objects and, as a result, have found that, a surface of at least a part to be in contact with a pulley, of a compression rubber layer in a frictional power transmission belt, is coated with a fiber layer via a fiber/resin mixture layer, the fiber/resin mixture layer contains a resin component and heat-resistant fibers having a softening point or a melting point higher than the vulcanization temperature of the rubber forming the compression rubber layer, and the fiber layer is a fiber layer containing hydrophilic heat-resistant fibers having a softening point or a melting point higher than the vulcanization temperature and not containing a resin component, then the noise suppression in pouring water can be improved, and they have completed the present invention.

That is, the frictional power transmission belt of the present invention is a frictional power transmission belt including a tension layer forming a belt back surface, a compression rubber layer formed on one surface of the tension layer and to be in contact with a pulley and frictionally engage with the pulley, and a tension member embedded between the tension layer and the compression rubber layer along a belt length direction, wherein the compression rubber layer has a surface to be in contact with the pulley, at least a part of the surface is coated with a fiber layer via a fiber/resin mixture layer, the fiber/resin mixture layer contains a resin component and heat-resistant fibers having a softening point or a melting point higher than a vulcanization temperature of a rubber forming the compression rubber layer, and the fiber layer contains hydrophilic heat-resistant fibers having a softening point or a melting point higher than the vulcanization temperature and does not contain a resin component. The heat-resistant fibers may include fibers embedded so as to extend from the fiber/resin mixture layer to the compression rubber layer. The resin component (the resin component contained in the fiber/resin mixture layer) may be a thermoplastic resin that can melt or soften at the vulcanization temperature (in particular, a polypropylene-based resin). The hydrophilic heat-resistant fibers may be cellulosic fibers. The heat-resistant fibers may be cellulosic fibers. A mass ratio of the resin component contained in the fiber/resin mixture layer (resin component) to a fiber component which is a sum of the heat-resistant fibers contained in the fiber/resin mixture layer and the hydrophilic heat-resistant fibers contained in the fiber layer (fiber component) may be resin component/fiber component=from 50/50 to 20/80 or so. The frictional power transmission belt of the present invention may be a V-ribbed belt including the compression rubber layer having a plurality of ribs extending in parallel to each other in the belt length direction.

The present invention also includes a production method for the frictional power transmission belt, the method including a winding step of sequentially winding a sheet for forming the tension layer, the tension member, an unvulcanized rubber sheet for forming the compression rubber layer, and a sheet-like structure for forming the fiber/resin mixture layer and the fiber layer, around a cylindrical drum to obtain a laminate sheet, and a vulcanization molding step of pressing the laminate sheet against a mold to vulcanize and mold the unvulcanized rubber sheet, wherein in the vulcanization molding step, the unvulcanized rubber sheet is pre-heated at a temperature lower than the vulcanization temperature and then vulcanized. In the winding step, as the sheet-like structure, a nonwoven fabric (1) containing a first thermoplastic resin having a softening point or a melting point not higher than the vulcanization temperature, a nonwoven fabric (2) containing the heat-resistant fibers, a nonwoven fabric (3) containing a second thermoplastic resin having a softening point or a melting point not higher than the vulcanization temperature, and a nonwoven fabric (4) containing the hydrophilic heat-resistant fibers may be sequentially wound in this order, or a laminate nonwoven fabrics including a first nonwoven fabric containing a first thermoplastic resin having a softening point or a melting point not higher than the vulcanization temperature and a second nonwoven fabric containing the hydrophilic heat-resistant fibers may be wound and arranged double with the first nonwoven fabric arranged on an inner side. A basis weight of the sheet-like structure may be from 50 to 150 g/m² or so.

Advantageous Effects of Invention

In the present invention, the surface of at least a part to be in contact with pulleys, of the compression rubber layer in the frictional power transmission belt, is coated with the fiber layer via the fiber/resin mixture layer, the fiber/resin mixture layer contains the resin component and the heat-resistant fibers having a softening point or a melting point higher than the vulcanization temperature of the rubber forming the compression rubber layer, and the fiber layer is a fiber layer containing the hydrophilic heat-resistant fibers having a softening point or a melting point higher than the vulcanization temperature and not containing a resin component. Therefore, the noise suppression in pouring water can be improved. Further, it is possible to improve noise suppression and wear resistance during a long period.

Figure 2:
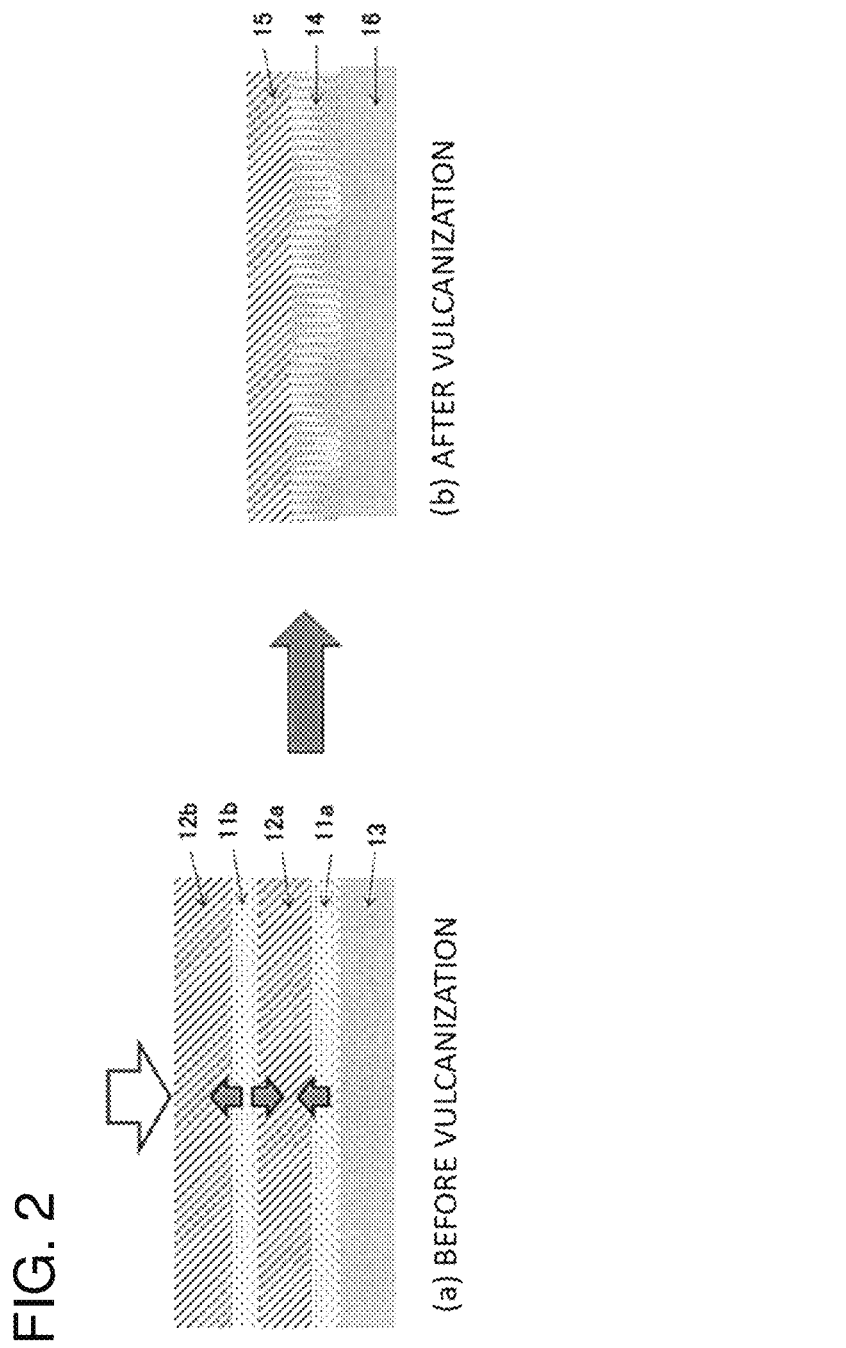

(a) and (b) of FIG. 2 illustrate schematic views illustrating an example of a production method for the frictional power transmission belt of the present invention.

Figure 3:
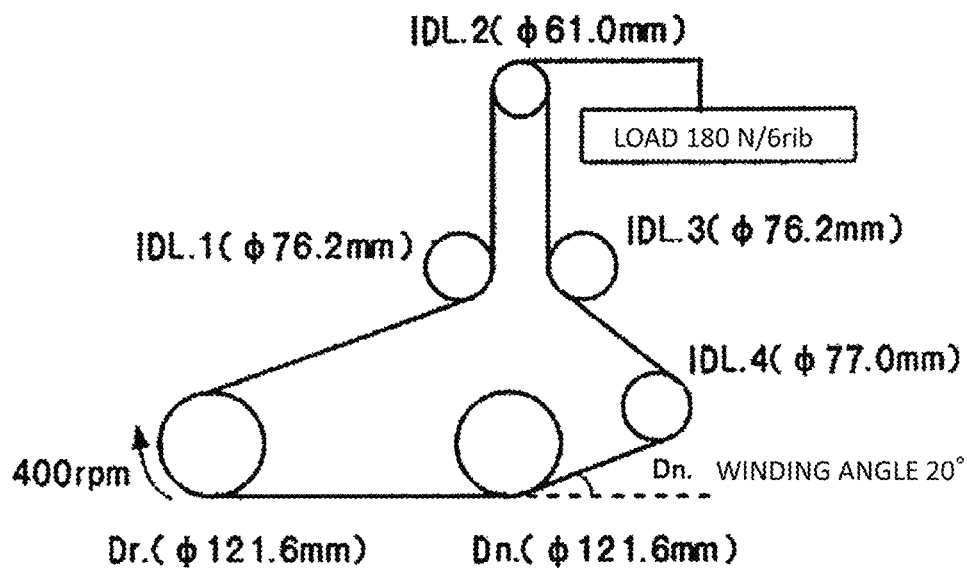

FIG. 3 is a schematic diagram illustrating a layout in a friction coefficient measurement test in ordinary running in Examples.

Figure 4:
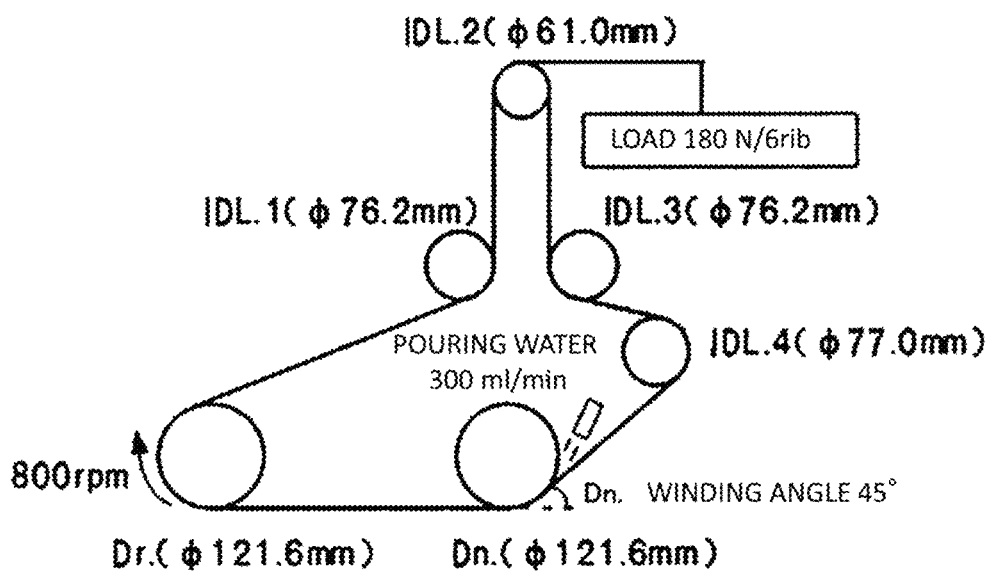

FIG. 4 is a schematic diagram illustrating a layout in a friction coefficient measurement test in running in pouring water in Examples.

Figure 5:
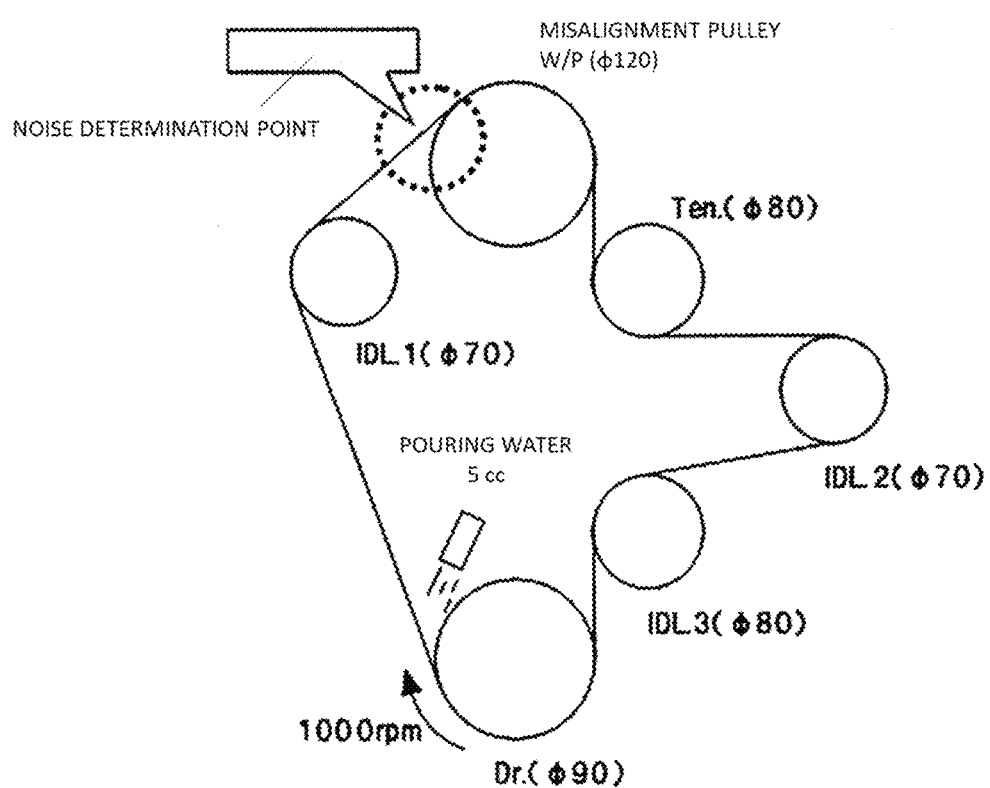

FIG. 5 is a schematic diagram illustrating a layout in a misalignment noise generation test in Examples.

Figure 6:
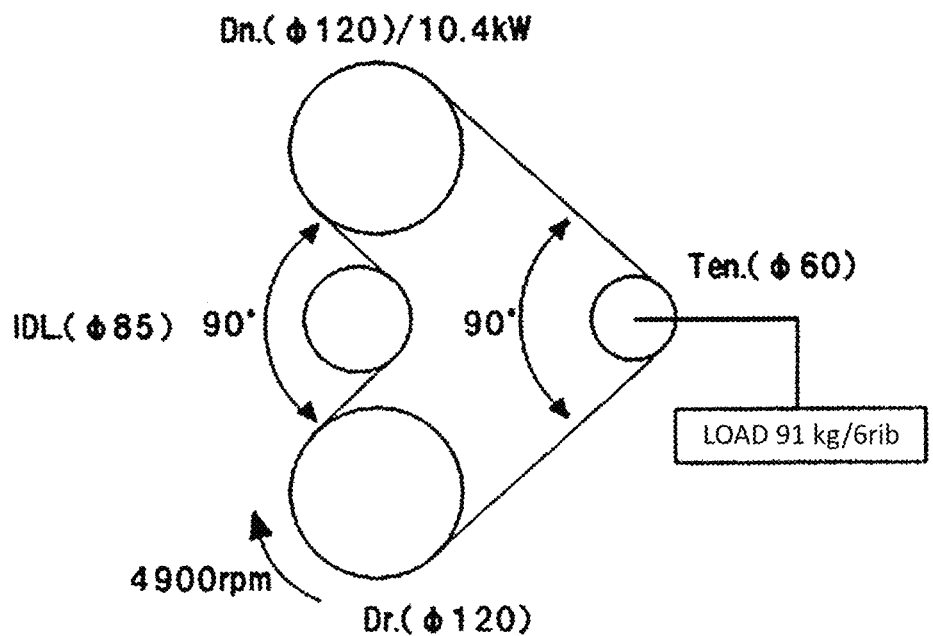

FIG. 6 is a schematic diagram illustrating a layout in a friction test in Examples.

Figure 7:
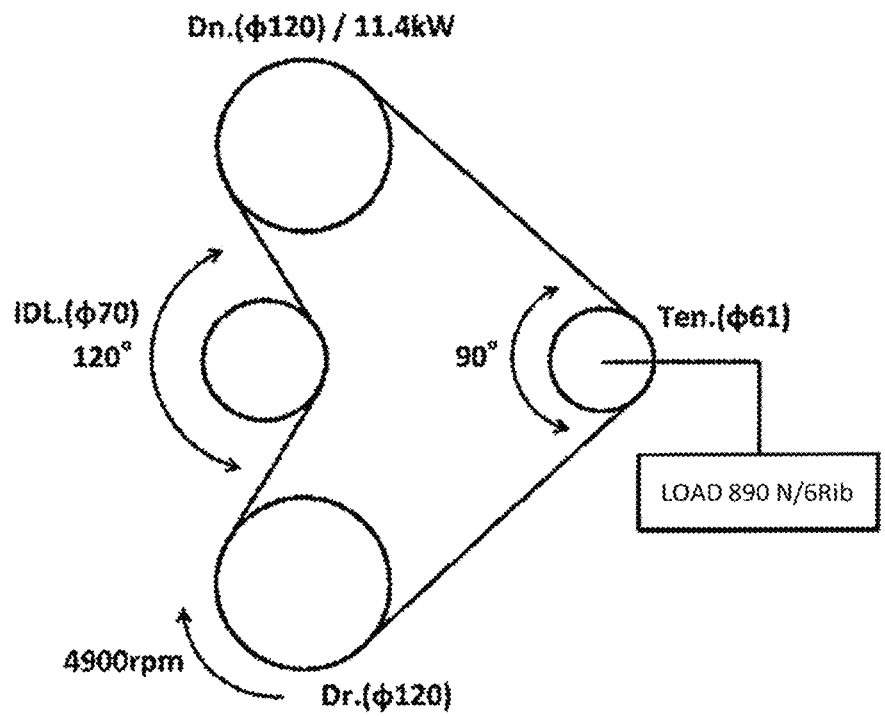

FIG. 7 is a schematic diagram illustrating a layout in a durable running test in Examples.

Figure 8:
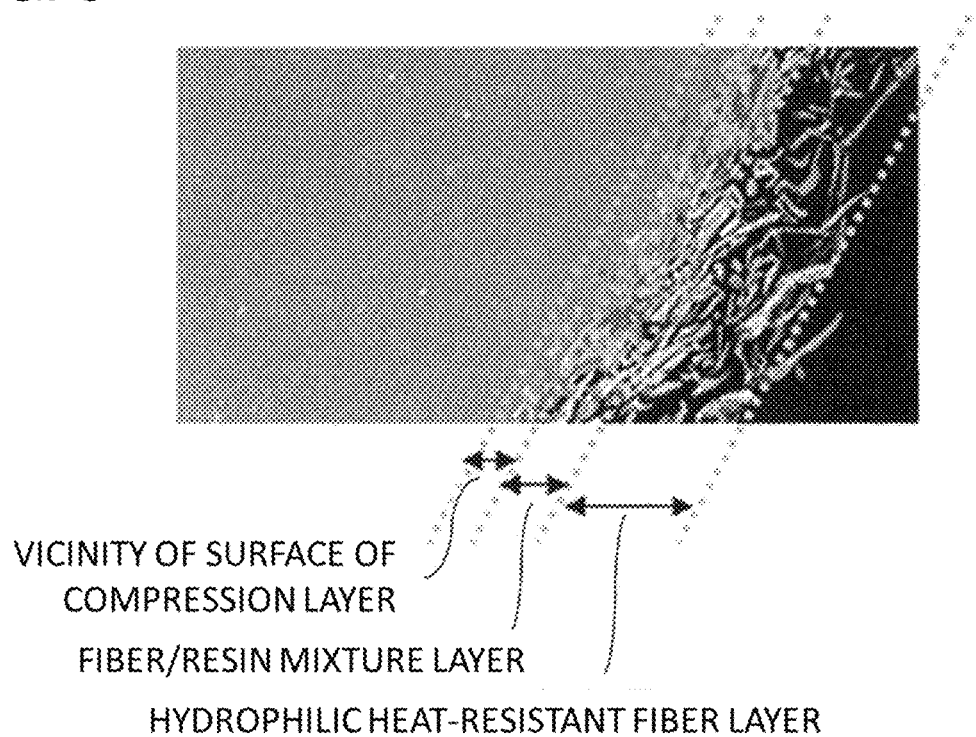

FIG. 8 is a scanning electromicroscopic picture of a rib cross section of the V-ribbed belt obtained in Example 2.

DESCRIPTION OF EMBODIMENTS

[Frictional Power Transmission Belt]

A frictional power transmission belt of the present invention is a frictional power transmission belt containing a tension layer forming a belt back surface, a compression rubber layer formed on one surface of the tension layer and to be in contact with a pulley and frictionally engage with the pulley, and a tension member embedded between the tension layer and the compression rubber layer along a belt length direction. The compression rubber layer has a surface to be in contact with the pulley, and at least a part of the surface is coated with a fiber layer via a fiber/resin mixture layer. The fiber/resin mixture layer contains a resin component and heat-resistant fibers having a softening point or a melting point higher than a vulcanization temperature of a rubber forming the compression rubber layer. The fiber layer contains hydrophilic heat-resistant fibers having a softening point or a melting point higher than the vulcanization temperature and does not contain a resin component. In the present invention, since at least a part of an outermost surface (frictional power transmission surface) to be in contact with a pulley of the compression rubber layer is coated with the fiber layer containing the hydrophilic heat-resistant fibers, it is possible to improve the noise resistance in pouring water.

In the frictional power transmission belt of the present invention, if desired, an adhesive layer may be provided between the compression rubber layer and the tension layer for improving the adhesiveness between the tension member and the tension layer or the compression rubber layer. The mode of providing the adhesive layer may be a mode where the tension member is embedded therein, or the mode where the tension member is embedded between the compression rubber layer and the adhesive layer or between the adhesive layer and the tension layer.

Examples of the frictional power transmission belt include various types of frictional power transmission belts such as a V-ribbed belt, a raw-edge V-belt, a flat belt, etc. Of those, preferred is a V-ribbed belt and a V-belt. Especially preferred is a V-ribbed belt which often provides a problem of noise generation by pouring water.

Figure 1:
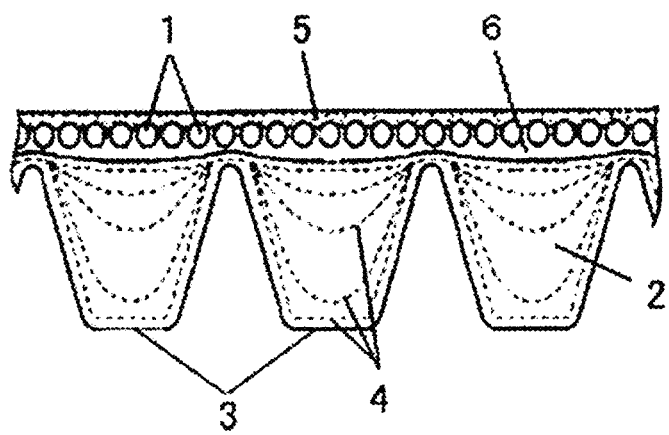
FIG. 1 is a schematic cross-sectional view illustrating one example of a V-ribbed belt.

FIG. 1 is a schematic cross-sectional view illustrating one example of a V-ribbed belt and a schematic cross-sectional view of cut in the belt width direction.

In this example, the V-ribbed belt is composed of, as laminated in this order from the bottom surface (inner periphery surface) of the belt to the top surface (back surface) of the belt, a compression rubber layer 2 having plural ribs 3, an adhesive layer 6, a tension member 1, and a tension layer 5 formed of a rubber composition, in which short fibers 4 are oriented in the compression rubber layer 2 so as to be in a flow state along the shape of each rib (in the vicinity of the surface of each rib, the short fibers 4 are in a state oriented along the external shape of the rib 3). The compression rubber layer 2 has, as arranged on the inner peripheral surface of the belt body, ribs 3 extending in plural lines along the length direction of the belt (in FIG. 1, the number of the ribs is 3), and the cross-section shape of the ribs 3 in the direction perpendicular to the length direction is an inverted trapezoid (having a V-shaped cross section) of such that the width thereof is narrowed in the direction from the outer peripheral side of the belt (on the side not having the ribs and not frictionally engaging with pulleys) toward the inner peripheral side thereof (or that is, tapered toward the top). The tension member 1 is embedded inside the body along the belt length direction, and a part thereof is in contact with the tension layer 5 while the remaining part thereof is in contact with the adhesive layer 6. Further, the surface of at least a part to be in contact with pulleys of the compression rubber layer 2 (the frictional power transmission surface of the ribs 3) is coated with a fiber/resin mixture layer and a fiber layer (not illustrated).

(Fiber/Resin Mixture Layer)

The fiber/resin mixture layer is formed on at least a part of the frictional power transmission surface to be in contact with pulleys of the compression rubber layer, but from the viewpoint of productivity, in general, it is formed on the entire surface of the compression rubber layer. The fiber/resin mixture layer contains a resin component, and heat-resistant fibers having a softening point or a melting point higher than the vulcanization temperature of the rubber forming the compression rubber layer (hereinafter simply referred to as the vulcanization temperature) in a mixed state. Therefore, by interposing the fiber/resin mixture layer between the compression rubber layer and the fiber layer, the frictional power transmission surface can be reinforced. Further, of the heat-resistant fibers in the fiber/resin mixture layer, at least a part of the fibers is preferably embedded so as to extend from the fiber/resin mixture layer to the surface vicinity of the inside of the compression rubber layer (the vicinity of the interface to the fiber/resin mixture layer). Since such the heat-resistant fibers embedded to bridge to both these two layers are contained, the part embedded in the compression rubber layer plays a role of an anchor effect so that the interface between the fiber/resin mixture layer and the compression rubber layer can be bonded more firmly, and therefore the fiber/resin mixture layer can be thus prevented from peeling away from the compression rubber layer. In addition, even when the wear of the fiber layer and the fiber/resin mixture layer goes on so that the surface of the compression rubber layer is exposed out, the heat-resistant fibers embedded in the compression rubber layer could be exposed out from the inside through wear and could exist like layers in the vicinity of the interface to the compression rubber layer to play a role of reinforcing the compression rubber layer. Consequently, the compression rubber layer (frictional power transmission surface) can secure the wear resistance even though the belt is run for a long period of time. An aspect in which the heat-resistant fibers are embedded in the compression rubber layer is the same as that of the aspect of embedding the heat-resistant fibers in the vicinity of the surface of the compression rubber layer in Patent Literature 2.

Of the heat-resistant fibers at least partly embedded in the vicinity of the interface inside the compression rubber layer, at least a part of the heat-resistant fibers may be embedded in the vicinity of the interface inside the compression rubber layer in the state where the resin component is attached to the heat-resistant fibers. The frictional power transmission film of the present invention is produced according to the production method to be mentioned below, and therefore, when the heat-resistant fibers are embedded in the vicinity of the interface inside the compression rubber layer at the time of forming ribs, the resin component is likely to attach to the surfaces of the heat-resistant fibers. When the resin component is attached to the surfaces of the heat-resistant fibers embedded in the compression rubber layer, the heat-resistant fibers and the material to form the compression rubber layer (e.g., rubber composition) can be firmly bonded to each other via the resin component therebetween. Specifically, the close contact (adhesiveness) between the two can be improved and therefore the heat-resistant fibers can be prevented from dropping off (removing away) and the fiber/resin mixture layer can be more surely prevented from peeling away from the surface of the compression rubber layer. Further, the heat-resistant fibers can be firmly fixed to the compression rubber layer and therefore, even when the fiber/resin mixture layer is worn away through the progress of wear, the heat-resistant fibers can be prevented from dropping away from the vicinity of the interface inside the compression rubber layer. Consequently, the wear resistance and noise suppression of the surface layer of the compression rubber layer (the frictional power transmission surface) can be thereby secured for a long period of time.

The embedded depth of the heat-resistant fibers embedded in the compression rubber layer (the thickness of the fiber/rubber mixture layer formed in a layer form by the heat-resistant fibers embedded in the vicinity of the interface inside the compression rubber layer) is, for example, from 5 to 150 μm, preferably from 10 to 120 μm (for example, from 30 to 100 μm), more preferably from 50 to 90 μm (especially preferably from 70 to 80 μm) or so, from the viewpoint that the heat-resistant fibers can be prevented from dropping off from the vicinity of the interface to the compression rubber layer and that the fiber/resin mixture layer can be prevented more surely from peeling from the surface layer of the compression rubber layer. When the embedded depth of the heat-resistant fibers is too shallow, the heat-resistant fibers would readily drop off so that it may be impossible to sufficiently prevent the fiber/resin mixture layer from peeling away from the surface layer of the compression rubber layer, while on the other hand, when the embedded depth of the fibers is too deep, the thickness of the heat-resistant fibers to be embedded would be large and, as a result, when the belt is inversely bend by pulleys so that the ribs are extended, the rib surfaces would be readily cracked and the belt life would be shortened. In the frictional power transmission belt of the present invention, the fiber/rubber mixture layer is preferably embedded to have a nearly uniform thickness in the vicinity of the interface to the compression rubber layer.

The mean thickness of the fiber/resin mixture layer is, for example, from 10 to 300 μm, preferably from 30 to 250 μm, more preferably from 50 to 200 μm or so (especially preferably from 70 to 150 μm). When the fiber/resin mixture layer is too thin, the cracking resistance and wear resistance may be deteriorated, and when too thick, the flexibility of the fiber/resin mixture layer may be deteriorated.

In this description, the embedded depth of the fibers and the thickness of the fiber/resin mixture layer can be measured on a scanning electron microscopic (SEM) picture, in which the data at arbitrary 5 or more sites are averaged. In detail, these are measured according to the method described later in the section of Examples.

(1) Heat-Resistant Fibers

The heat-resistant fibers may contain long fibers, and may be fibers formed of long fibers alone, but preferably contain at least short fibers. Further, the heat-resistant fibers may contain different types of heat-resistant fibers (plural types of heat-resistant fibers).

The heat-resistant fibers have a softening point or a melting point higher than a vulcanization temperature (e.g., from 150 to 200° C., especially 170° C. or so) for retaining the fibrous form after vulcanization of the rubber forming the compression rubber layer and imparting various functions to the belt, and various types of synthetic fibers and inorganic fibers can be used. The softening point or melting point (or decomposition point) of the heat-resistant fibers may be, for example, T+10° C. or more when the vulcanization temperature is taken as T, and may be, for example, from (T+10) to (T+400)° C., preferably from (T+20) to (T+370)° C., more preferably from (T+20) to (T+350)° C. or so. The heat-resistant fibers have a softening point or a melting point higher than the vulcanization temperature, and therefore even after vulcanization of the rubber forming the compression rubber layer, they can still maintain the fibrous form and can impart desired properties (as reflecting the characteristics of the heat-resistant fibers) to the frictional power transmission surface.

Examples of the heat-resistant fibers include heat-resistant fibers conventionally used for frictional power transmission belts, for example, natural fibers (cellulosic fibers, wool, silk, etc.); synthetic fibers [aliphatic polyamide fibers (polyamide 6, polyamide 66, polyamide 46 fibers, etc.), polyester fibers (poly-$C_{2-4}$ alkylene-$C_{6-14}$ arylate fibers such as polybutylene terephthalate, polyethylene terephthalate, polyethylene naphthalate fibers, etc.), fluorine fibers (polytetrafluoroethylene fibers, etc.), polyacrylic fibers (polyacrylonitrile fibers, etc.), polyvinyl alcohol fibers, polyphenylene sulfide (PPS) fibers, poly-p-phenylene benzobisoxazole (PBO) fibers, aromatic polyamide fibers (p-aramid, m-aramid fibers, etc.), etc.]; inorganic fibers (carbon fibers, glass fibers, etc.), etc.

These heat-resistant fibers may be used either singly or in combination of two or more thereof. When two or more types of heat-resistant fibers are combined, the fiber/resin mixture layer may have either a single layer structure in which different types of heat-resistant fibers are mixed uniformly or a plurality of laminate structures in which different heat-resistant fibers are laminated. Of these, from the viewpoint of productivity and the like, the fiber/resin mixture layer is preferably a single layer, and particularly preferably a single layer formed of the same type of heat-resistant fibers.

Of these heat-resistant fibers, from the viewpoint of the capability of improving the noise resistance in pouring water even when the fiber layer is worn, hydrophilic heat-resistant fibers having high affinity with water (water absorbability) are preferable, and cellulosic fibers are particularly preferable.

Examples of the cellulosic fibers include cellulose fibers (cellulose fibers derived from plants, animals, bacteria, etc.) and fibers of cellulose derivatives. Examples of the cellulose fibers include natural plant-derived cellulose fibers (pulp fibers) such as wood pulp (coniferous tree or broadleaf tree pulp, etc.), bamboo fibers, sugar cane fibers, seed hair fibers (cotton fibers (cotton linters), kapok, etc.), bast fibers (hemp, kouzo (paper mulberry), mitsumata (oriental paperbush), etc.), and leaf fibers (Manila hemp, New Zealand hemp, etc.); animal-derived celluloses such as sea squirts celluloses; bacterial cellulose fibers; algal celluloses, and the like. Examples of the fibers of cellulose derivatives include cellulose ester fibers; regenerated cellulose fibers (rayon, cupra, lyocell, etc.), and the like. Of these cellulosic fibers, from the viewpoint of achieving excellent balance between water absorbability and wear resistance, cellulose fibers are preferable, and pulp is particularly preferable.

The fibrous form of the heat-resistant fibers is not specifically limited, and may be in any form of a monofilament, a multifilament, a spun yarn or the like, or may be in a combined form of these.

The heat-resistant fibers may be any of short fibers and long fibers, but preferably contain at least short fibers. The mean length of the short fibers is, for example, from 1 to 500 mm, preferably from 2 to 300 mm, more preferably from 3 to 200 mm (especially from 5 to 100 mm) or so. If the fiber length of the short fibers is too short, the reinforcing effect of the frictional power transmission surface may be deteriorated, and if too long, it may be difficult to form fibers at the interface to the compression rubber layer. On the other hand, the mean length of the long fibers is higher than 500 mm, for example, not lower than 501 mm, preferably 1 to 1500 m, and more preferably 1 to 1000 m (especially preferably 1 to 500 m) or so.

In order to adjust the embedded depth of the heat-resistant fibers in the compression rubber layer, long fibers and short fibers may be combined. When long fibers are blended, from the viewpoint of easily winding the nonwoven fabric upon production of the belt and forming an appropriate rib shape even with fibers having small elongation, the long fibers are preferably arranged along the longitudinal direction of the belt. The proportion of the long fibers may be not higher than 70 mass %, preferably not higher than 50 mass %, and more preferably not higher than 30 mass % (for example, 1 to 10 mass % or so) in the heat-resistant fiber. If the proportion of the long fibers is too high, it may be difficult to form fibers at the interface to the compression rubber layer.

The mean fiber diameter of the heat-resistant fibers is, for example, 5 to 50 μm, preferably from 7 to 40 μm, more preferably from 10 to 35 μm or so.

The form (the form of fiber assembly) of the heat-resistant fibers in the fiber/resin mixture layer may be appropriately selected depending on the length of the fibers, and may be a woven fabric structure or a knitted fabric structure, but usually has a nonwoven fabric structure (nonwoven fiber structure) in the case of containing short fibers.

For the purpose of improving the adhesiveness thereof to the compression rubber layer, the heat-resistant fibers may be subjected to an adhesion treatment, in the stage of the raw material. As for the adhesion treatment, heat-resistant fibers may be treated by immersing in a resin-based processing liquid of an epoxy or isocyanate compound dissolved in an organic solvent (toluene, xylene, methyl ethyl ketone, etc.), or may be treated by immersing in a processing liquid of a resorcinol-formalin-latex liquid (RFL liquid), etc. For the purpose of imparting adhesiveness between the heat-resistant fibers and the component to form the compression rubber layer and/or imparting the performance of the frictional power transmission surface, for example, a rubber composition may be dissolved in the above-mentioned organic solvent to prepare a rubber paste, and the raw material of the heat-resistant fibers (nonwoven fabric, etc.) may be treated by immersing in the resultant rubber paste so as to infiltrate and adhere the rubber composition to the heat-resistant fibers. These treatments may be carried out singly or in combination, and the treatment frequency and the treatment order are not specifically limited and may be conducted with suitable changes.

(2) Resin Component

The resin component is preferably capable of melting at the vulcanization temperature so as to express a role like a binder for the fibers to form a fiber/resin mixture layer, and capable of adhering also to the surfaces of the fibers to be embedded in the compression rubber layer to thereby improve the close contact between the fiber/resin mixture layer and the compression rubber layer. In general, a thermoplastic resin that can melt or soften at the vulcanization temperature is used, but a thermosetting resin that can melt or soften at the vulcanization temperature is also usable.

The resin component is not specifically limited as long as the melting point (or softening point) is not higher than the vicinity of the vulcanization temperature (e.g., from 150 to 200° C., especially 170° C. or so), but from the viewpoint of maintaining an appropriate viscosity upon vulcanization and easily forming the fiber layer at an appropriate thickness, the melting point is, for example, when the vulcanization temperature is taken as T, from (T−50) to (T+10)° C., preferably from (T−30) to (T+5)° C., more preferably from (T−10) to T° C. or so. When the melting point is in the vicinity of the vulcanization temperature, the resin component melts with an appropriate viscosity upon vulcanization of the rubber forming the compression rubber layer, and can be solidified in a form containing a part of the hydrophilic heat-resistant fibers after vulcanization. The specific melting point is, for example, 150 to 180° C., preferably 160 to 175° C., and more preferably 165 to 170° C. or so. If the melting point is too high, it may be difficult to form a homogeneous fiber/resin mixture layer, and if too low, the viscosity may be too low upon vulcanization such that the resin component is impregnated into the surface of the fiber layer, and thus it is difficult to form a fiber layer having an appropriate thickness.

The material of the resin component is not particularly limited as long as it has the melting point, but from the viewpoint of the handleability and the general versatility thereof, preferred is an olefinic resin such as a polyethylene resin, a polypropylene resin, etc., and from the viewpoint of maintaining an appropriate viscosity upon vulcanization and easily forming a fiber layer having an appropriate thickness, particularly preferred is a polypropylene resin.

Examples of the polypropylene resin include polypropylene, a copolymer of propylene and a monomer copolymerizable with propylene (a binary copolymer such as a propylene-ethylene copolymer and a propylene-(meth)acrylic acid copolymer; and a terpolymer such as a propylene-ethylene-butene-1) and the like. These polypropylene resins may be used either singly or in combination of two or more types thereof. Of these polypropylene resins, a homopolymer of propylene such as polypropylene or the like is preferable.

Among them, a polypropylene resin such as polypropylene is particularly preferable from the viewpoint of easily melting at the vulcanization temperature and appropriate and excellent heat resistance.

The form of the resin component is any one capable of filling up the space between the fibers and capable of adhering to the surfaces of the fibers, and not specifically limited. As described below, however, in case where a fibrous raw resin material is used and even when it is a thermoplastic resin having a melting point (or softening point) not higher than the vulcanization temperature, the fibrous form thereof would partly remain as such. In the present invention, in the case where a fibrous resin having a melting point (or softening point) not higher than the vulcanization temperature is used as a raw material, the component in which the fibrous form thereof partly remains as such after vulcanization, is not grouped in the category of the heat-resistant fibers but in the category of the resin component.

The resin component may be subjected to the same adhesion treatment (or surface treatment) as that for the heat-resistant fibers.

The proportion (mass ratio) of the resin component to the heat-resistant fibers is selected from a range of resin component/heat-resistant fibers=from 99/1 to 1/99 or so, for example, from 95/5 to 5/95, more preferably from 85/15 to 15/85, even more preferably from 75/25 to 25/75 (especially from 70/30 to 30/70) or so. When the resin component and the heat-resistant fibers are combined in the proportion as above, the surface of the compression rubber layer is covered with the fiber/resin mixture layer and at least a part of the heat-resistant fibers is embedded so as to extend from the fiber/resin mixture layer to the inside of the vicinity of the surface of the compression rubber layer.

(3) Other Additives

If desired, the fiber/resin mixture layer, may contain any ordinary additive, for example, surfactants, enhancers, fillers, metal oxides, plasticizers, processing agents or processing aids, colorants, coupling agents, stabilizers (UV absorbers, antioxidants, antiozonants, thermal stabilizers), lubricants, a flame retardant, an antistatic agent and the like. Of these, from the viewpoint of bleeding out so as to improve the wettability with water of the fiber layer, and thereby improving and the ability of the hydrophilic heat-resistant fibers to sweep out water as well as the water absorbability (hydrophilicity) of the surfaces of the ribs, a surfactant having an HLB (hydrophilic-lipophilic balance) of 5 to 15 (especially 7 to 15) or so may be contained. The proportion of the additive is, relative to the whole of the fiber/resin mixture layer, from 0.1 to 50% by mass, preferably from 0.5 to 30% by mass, more preferably from 1 to 20% by mass (especially from 1.5 to 10% by mass) or so.

(Fiber Layer)

The fiber layer is coated on the outermost surface of the compression rubber layer, and contains hydrophilic heat-resistant fibers having a softening point or a melting point higher than the vulcanization temperature and does not contain a resin component. Therefore, it is flexible and excellent in water absorbability, and thus can improve the noise resistance in pouring water. In the present invention, the reason why the noise resistance in pouring water is significantly improved is estimated that due to the presence of the fiber layer located on the outermost surface, since the water that has entered between the belt and the pulleys can be absorbed rapidly, generation of a water film between the belt and the pulleys can be prevented, and thus the difference between the friction coefficient upon ordinary running (DRY) and the friction coefficient upon running in pouring water (WET) is reduced.

As the hydrophilic heat-resistant fibers contained in the fiber layer, the hydrophilic heat-resistant fibers exemplified as the heat-resistant fibers contained in the fiber/resin mixture layer can be used, and cellulosic fibers can be preferably used. As the cellulosic fibers, the cellulosic fibers contained in the fiber/resin mixture layer can be used, and cellulose fibers (especially pulp) can be preferably used. The fiber form and the mean length of the heat-resistant fibers are also the same as those of the heat-resistant fibers contained in the fiber/resin mixture layer.

The form (the structure of fiber assembly) of the fiber layer may be appropriately selected depending on the length of the fibers, and may be a woven fabric structure or a knitted fabric structure, but usually has a nonwoven fabric structure (nonwoven fiber structure) in the case of containing short fibers.

The fiber layer is preferably entangled and integrated with the fiber/resin mixture layer, and is particularly preferably a remainder (non-impregnated portion) when a part of a nonwoven fabric having a previously integrated nonwoven fiber structure is impregnated with a resin component.

The fiber layer does not contain a resin component, and thus is excellent in flexibility and porosity. Other additives exemplified in the fiber/resin mixture layer may be contained as long as such characteristics are not impaired. The proportion of other additives is the same as that of the fiber/resin mixture layer.

The mean thickness of the fiber layer is, for example, from 10 to 300 μm, preferably from 30 to 250 μm, more preferably from 50 to 200 μm or so (especially preferably from 70 to 150 μm). The mean thickness of the fiber layer is, for example, from 0.1 to 5 times, preferably from 0.5 to 3 times, more preferably from 1 to 2 times or so with respect to the mean thickness of the fiber/resin mixture layer. When the fiber layer is too thin, the water absorbability and wear resistance may be deteriorated, and when too thick, shape failure may occur upon production of the belt.

The porosity of the fiber layer is, for example, from 50 to 98%, preferably from 60 to 97%, and more preferably from 75 to 95% (especially from 80 to 90%) or so.

The mass ratio of the resin component contained in the fiber/resin mixture layer and the fiber layer (the resin component contained in the fiber/resin mixture layer) to the fiber component (the sum of the heat-resistant fibers contained in the fiber/resin mixture layer and the hydrophilic heat-resistant fibers contained in the fiber layer) is resin component/fiber component=from 70/30 to 10/90, preferably from 50/50 to 20/80, and more preferably from 40/60 to 25/75 (especially from 35/65 to 25/75) or so. Further, in applications requiring high noise resistance in pouring water, resin component/fiber component may be from 40/60 to 10/90, preferably from 35/65 to 15/85, and more preferably from 30/70 to 20/80 or so. If the proportion of the resin component is too small, the heat-resistant fiber may be fixed insufficiently, and the heat-resistant fiber may scatter early. On the other hand, if too large, the water absorbability may be deteriorated, and the noise resistance may be deteriorated.

As described above, the frictional power transmission belt having the fiber layer on the outermost surface of the compression rubber layer has a small difference between the friction coefficient upon ordinary running (DRY) and the friction coefficient upon running in pouring water (WET), and thus is capable of preventing stick-slip, which is a cause of noise generation, and is capable of improving the noise resistance in pouring water. The difference (DRY−WET) between the friction coefficient of DRY and the friction coefficient of WET may be not higher than 0.3, preferably not higher than 0.2, and more preferably not higher than 0.1. In the present specification and claims, the friction coefficient is measured by a method described in Examples described later.

(Compression Rubber Layer)

The compression rubber layer can be suitably selected depending on the type of the belt, and usable is, for example, a rubber composition containing a rubber component and a vulcanizing agent or a crosslinking agent, or a polyurethane resin composition.

As the rubber component, examples thereof include a vulcanizable or crosslinkable rubber including, for example, dienic rubber (natural rubber, isoprene rubber, butadiene rubber, chloroprene rubber, styrene-butadiene rubber (SBR), acrylonitrile-butadiene rubber (nitrile rubber), hydrogenated nitrile rubber, mixed polymer of hydrogenated nitrile rubber and unsaturated carboxylic acid metal salt, etc.), ethylene-α-olefin elastomer, chlorosulfonated polyethylene rubber, alkylated chlorosulfonated polyethylene rubber, epichlorohydrin rubber, acrylic rubber, silicone rubber, urethane rubber, fluorine rubber, etc.

Examples of the polyurethane resin composition include a cured product of an urethane prepolymer with a curing agent (two-pack curable polyurethane), etc.

Of those, preferred is a case of forming a rubber composition containing sulfur or an organic peroxide (especially, an organic peroxide-valcanizable rubber composition) into an unvulcanized rubber layer, and vulcanizing or crosslinking the unvulcanized rubber layer. Especially preferred is an ethylene-α-olefin elastomer (ethylene-α-olefinic rubber), as excellent in adhesiveness in a case where an olefinic resin is used as the resin component, not containing any harmful halogen, having ozone resistance, heat resistance and cold resistance, and excellent in economic efficiency.

The rubber composition generally contains a vulcanizing agent or a crosslinking agent (especially organic peroxide), a vulcanization accelerator, or a co-crosslinking agent (crosslinking aid, or co-vulcanizing agent). The proportion of the vulcanizing agent or the crosslinking agent is, for example, relative to 100 parts by mass of the rubber component, from 1 to 10 parts by mass (especially from 2 to 5 parts by mass) or so in terms of the solid content thereof. The proportion of the vulcanization accelerator is, in terms of the solid content thereof and relative to 100 parts by mass of the rubber component, for example, from 0.5 to 15 parts by mass (especially from 2 to 5 parts by mass) or so. The proportion of the crosslinking aid is, in terms of the solid content thereof and relative to 100 parts by mass of the rubber component, for example, from 0.01 to 10 parts by mass (especially from 0.1 to 5 parts by mass) or so.

The rubber composition may contain short fibers. As the short fibers, usable are the same fiber as the fibers exemplified as the heat-resistant fibers as mentioned above. Those short fibers may be used either singly or in combination of two or more thereof. Of those fibers, widely used are cellulosic fibers such as cotton or rayon, polyester fibers (PET fibers, etc.), polyamide fibers (aliphatic polyamide fibers such as polyamide 6, etc., aramid fibers, etc.), etc.

The mean fiber length of the short fibers may be, for example, from 1 to 20 mm, preferably from 2 to 15 mm, more preferably from 3 to 10 mm or so. The mean fiber diameter of the short fibers is, for example, from 5 to 50 μm, preferably from 7 to 40 μm, more preferably from 10 to 30 μm or so. The proportion of the short fibers is, relative to 100 parts by mass of the rubber component, for example, from 1 to 50 parts by mass (especially from 10 to 35 parts by mass) or so.

If desired, the rubber composition may contain any ordinary additive, for example, a vulcanization aid, a vulcanization accelerator, a vulcanization retardant, an augmenting agent, a filler, a metal oxide, a softener, a processing agent or a processing aid, an anti-aging agent, a colorant, a tackifier, a plasticizer, a coupling agent, a stabilizer, a lubricant, a flame retardant, an antistatic agent, etc.

The mean thickness of the compression rubber layer can be suitably selected depending on the type of the belt. In the case of a V-ribbed belt, for example, it is from 2 to 25 mm, preferably from 2.2 to 16 mm, more preferably from 2.5 to 12 mm or so.

(Tension Member)

As the fibers constituting the tension member, there are exemplified the same fibers as the fibers exemplified as the above-mentioned heat-resistant fibers. Of those, widely used are synthetic fibers such as polyester fibers, aramid fibers, etc., and inorganic fibers such as glass fibers, carbon fibers, etc., from the viewpoint of the high modulus thereof. Especially preferred are polyester fibers and aramid fibers as capable of lowering the belt slip ratio. The polyester fibers may be multifilament yarns. The fineness of the tension member composed of multifilament yarns may be, for example, from 2,000 to 10,000 denier (especially from 4,000 to 8,000 denier) or so. For the purpose of improving the adhesiveness thereof to the rubber component, the tension member may be subjected to an ordinary adhesion treatment, for example, adhesion treatment with a resorcinol-formalin-latex liquid (RFL liquid).

As the tension member, in general, usable is a twisted cord formed of multifilament yarns (e.g., plied, single-twist or Lang's lay). The mean wire diameter of the tension member (fiber diameter of twisted cord) may be, for example, from 0.5 to 3 mm, preferably from 0.6 to 2 mm, more preferably from 0.7 to 1.5 mm or so. The tension member is embedded in the length direction of the belt, and may be arranged in parallel at a predetermined pitch parallel to the length direction of the belt.

(Adhesive Layer)

The same rubber composition as those exemplified as the above-mentioned compression rubber layer can be used for the adhesive layer. In the rubber composition of the adhesive layer, the rubber component is, in many cases, of the same type or the same series as that of the rubber of the rubber component in the rubber composition for the above-mentioned compression rubber layer. The proportion of the additive, such as the vulcanizing agent or the crosslinking agent as well as the co-crosslinking agent or the crosslinking aid, the vulcanization accelerator or the like may also be selected from the same range as that in the rubber composition for the compression rubber layer. The rubber composition for the adhesive layer may further contain an adhesiveness improver (resorcinol-formaldehyde co-condensate, amino resin, etc.).

The thickness of the adhesive layer may be suitable selected depending on the type of the belt. In the case of a V-ribbed belt, it is, for example, from 0.4 to 3.0 mm, preferably from 0.6 to 2.2 mm, more preferably from 0.8 to 1.4 mm or so.

(Tension Layer)

The tension layer may be formed of the same rubber composition as those exemplified as the above-mentioned compression rubber layer, and may be formed of a fabric (reinforcing fabric) such as a canvas fabric, etc.

Examples of the reinforcing fabric include a fabric material such as a woven fabric, a wide-angle canvas fabric, a knitted cloth, a nonwoven fabric, etc. Of those, preferred are a woven fabric that is woven in a mode of plain weaving, twilling, sateen weaving or the like, and a wide-angle canvas fabric or a woven fabric in which the crossing angle between the warp and the weft is from 90 to 120° or so. As the fibers constituting the reinforcing fabric, use can be made of the same fibers exemplified as the above-mentioned short fibers. The reinforcing fabric may be treated with the above-mentioned RFL liquid (immersion treatment, etc.) followed by rubbing a rubber composition through friction or lamination (coating) to form a canvas fabric with rubber.

Of the above, preferred is a tension layer formed of a rubber composition. In the rubber composition for the tension layer, the rubber component is, in many cases, of the same type or the same series as that of the rubber component in the rubber composition for the above-mentioned compression rubber layer. The proportion of the additive, such as the vulcanizing agent or the crosslinking agent as well as the co-crosslinking agent or the crosslinking aid, the vulcanization accelerator or the like may also be selected from the same range as that in the rubber composition for the compression rubber layer.

The rubber composition may contain the same short fibers as in the compression rubber layer, for the purpose of preventing noise generation owing to the adhesion of the back rubber during driving on the back. The short fibers may be oriented randomly in the rubber composition. Further, the short fibers may be short fibers bent partially.

Further, for preventing noise generation during driving on the back, the surface of the tension layer (the back surface of the belt) may have a concavo-convex pattern provided. The concavo-convex pattern includes a knitted fabric pattern, a woven fabric pattern, a bamboo blind-like woven pattern, an embossed pattern, etc. Of those patterns, preferred are a woven fabric pattern and an embossed pattern. Further, at least a part of the back surface of the tension layer may be covered with the above-mentioned fiber/resin mixture layer.

The thickness of the tension layer can be suitably selected depending on the type of the belt. In the case of a V-ribbed belt, for example, it is from 0.4 to 2 mm, preferably from 0.5 to 1.5 mm, more preferably from 0.7 to 1.2 mm or so.

[Method for Producing Frictional Power Transmission Belt]

The frictional power transmission belt of the present invention can be produced through a winding step of sequentially winding a sheet for forming a tension layer (sheet for tension layer), a tension member, an unvulcanized rubber sheet for forming a compression rubber layer (sheet for compression rubber layer), and a sheet-like structure for forming a fiber/resin mixture layer and a fiber layer (a structure for fiber/resin mixture layer and fiber layer), around a cylindrical drum so as to obtain a laminate sheet, and a vulcanization molding step of pressing the obtained laminate sheet against a mold to vulcanize and mold the unvulcanized rubber sheet.

Specifically, in the winding step, first, the unvulcanized sheet for tension layer is wound around an inner mold equipped with a flexible jacket around the outer periphery thereof, then a tension member is helically spun thereover, and further the unvulcanized sheet for compression rubber layer and a sheet-like material for fiber/resin mixture layer and fiber layer are sequentially wound therearound to produce a molded body.

In this step, the fiber/resin mixture layer and the fiber layer structure may be separate sheet-like structures for respectively forming the fiber/resin mixture layer and the fiber layer (for example, a combination of: a nonwoven fabric formed by mixing a fibrous resin component for forming a resin component and heat-resistant fibers; and a nonwoven fabric formed of hydrophilic heat-resistant fibers), but is preferably a plurality of sheet-like structures including a sheet-like structure for forming a resin component and a sheet-like structure for forming hydrophilic heat-resistant fibers. By combining a sheet-like structure for forming a resin component and a sheet-like structure for forming a hydrophilic heat-resistant fiber, via heating and pressurization in the next vulcanization molding step, the resin component is melted and impregnated between the hydrophilic heat-resistant fibers, and thus the fiber layer and the fiber/resin mixture layer can be firmly integrated by a simple production method by forming the fiber layer at the non-impregnated portion of the hydrophilic heat-resistant fibers.

The plurality of sheet-like structures include a structure for resin component for forming the fiber/resin mixture layer and a structure for hydrophilic heat-resistant fibers for forming the fiber/resin mixture layer and the fiber layer, and may further include a sheet-like structure for forming the heat-resistant fibers for forming the fiber/resin mixture layer (structure for heat-resistant fibers).

In the vulcanization molding step, the structure for resin component is capable of penetrating among the hydrophilic heat-resistant fibers (and among the heat-resistant fibers) so as to form the fiber/resin mixture layer, and may be, for example, a sheet, a film, a woven fabric, a knitted fabric, a nonwoven fabric, or the like, but is preferably a fibrous structure such as a woven fabric, a knitted fabric, or a nonwoven fabric, and particularly preferably a nonwoven fabric. The fibrous structure such as a nonwoven fabric improves the close contact with the compression rubber layer probably because the fibers are entangled with each other with respect to the hydrophilic heat-resistant fibers (and the heat-resistant fibers). In the case of the fibrous structure, the mean fiber diameter of the heat-resistant fibers is, for example, 5 to 50 µm, preferably from 7 to 40 µm, more preferably from 10 to 35 µm or so. In the case of short fibers, the mean length is, for example, from 1 to 500 mm, preferably from 3 to 300 mm, more preferably from 5 to 100 nm or so. The fibrous form of the constituent fibers is not specifically limited, and may be in any form of a monofilament, a multifilament, a spun yarn or the like, or may be in a combined form of these.

The form of the structure for hydrophilic heat-resistant fibers and the structure for heat-resistant fibers may be a woven fabric or a knitted fabric, but is preferably a nonwoven fabric, from the viewpoint of excellent flexibility and water absorbability, and the capability in the fiber/resin mixture layer of being embedded in the interface with the compression rubber layer and being firmly integrated with the compression rubber layer.

The plurality of sheet-like structures may be a combination of a single structure for resin component and a single structure for hydrophilic heat-resistant fibers, but may also be a combination of a plurality of sheet-like structures, for example, a combination of two structures for resin component and two structures for heat-resistant fibers (two structures for hydrophilic heat-resistant fibers, or two in total of a structure for hydrophilic heat-resistant fibers and a structure for heat-resistant fibers). A combination of a plurality of sheet-like structures is advantageous in having an increased total thickness of the fiber layer and the resin/fiber mixture layer in order to improve the wear resistance and the noise resistance. If the basis weight of each sheet-like structure in the plurality of sheet-like structures is increased for such purpose, the flow of the rubber upon vulcanization is inhibited, and shape failure is likely to occur. On the other hand, if more sheet-like structures are combined together, and occurrence of shape failure can be prevented and the total thickness can be increased, probably because that a plurality of sheet-like structures having a smaller basis weight are overlapped and wound and thus the rubber upon vulcanization can flow smoothly.

As a combination of a plurality of sheet-like structures, preferred is a combination of: a nonwoven fabric (1) containing a first thermoplastic resin having a softening point or a melting point not higher than the vulcanization temperature, a nonwoven fabric (2) containing the heat-resistant fibers, a nonwoven fabric (3) containing a second thermoplastic resin having a softening point or a melting point not higher than the vulcanization temperature, and a nonwoven fabric (4) containing the hydrophilic heat-resistant fibers. In this combination, the nonwoven fabrics (1) and (3) are sheet-like structures for resin component, the nonwoven fabric (2) is a sheet-like structure for heat-resistant fibers, and the nonwoven fabric (4) is a sheet-like structure for hydrophilic heat-resistant fibers. By sequentially winding the nonwoven fabrics (1) to (4) in this order on the unvulcanized rubber sheet for forming the compression rubber layer, and vulcanizing in the next vulcanization molding step, on the entire region of the nonwoven fabric (2) and a part of the nonwoven fabric (4), the resin component of the melted nonwoven fabrics (1) and (3) is impregnated to form the resin/fiber mixture layer, and the non-impregnated region of the nonwoven fabric (4) forms the fiber layer. The first thermoplastic resin and the second thermoplastic resin may be the same or different.

Although the nonwoven fabrics (1) to (4) may each be wound independently, it is preferable to wind a laminate of previously laminated and integrated nonwoven fabric (1) and nonwoven fabric (2), and then wind a laminate of previously laminated and integrated nonwoven fabric (3) and nonwoven fabric (4). When the previously laminated laminates are used, it becomes unnecessary to separately wind the nonwoven fabric for forming the resin component and the nonwoven fabric for forming the heat-resistant fibers in the winding step, that is, only one winding operation is required, and therefore it is excellent in operability and the productivity, and in addition, any influence on the interface (generation of gaps, etc.) due to separate winding could be prevented. Further, probably because the uniformity in the fiber/resin mixture layer can be improved, the ability of the belt to suppress noise generation and to enhance wear resistance can be thereby improved. The proportion of the nonwoven fabric for forming the resin component and the nonwoven fabric for forming the heat-resistant fibers can be adjusted with ease by a method of changing the thickness of at least one of the two (e.g., by increasing the winding frequency, or by combining nonwoven fabrics having different thicknesses).

In the present invention, the structure for resin component is arranged on the compression rubber layer side, and the structure for heat-resistant fibers or the structure for hydrophilic heat-resistant fibers is arranged on the pulley side, so that the surface of the compression rubber layer could be surely covered with the resin having softened or melted during vulcanization. Further, since the structure for hydrophilic heat-resistant fibers is arranged on the outermost surface of the pulley side, it is possible to form a fiber layer capable of surely reflecting the characteristics (e.g., water absorbability, wear resistance) of the heat-resistant fibers on the frictional power transmission surface. In addition, by adopting such a laminated form, it is possible to prevent many of the heat-resistant fibers from being embedded in the vicinity of the interface inside the compression rubber layer. Specifically, the resin component plays a role of a barrier that controls the penetration degree (embedded depth) the heat-resistant fibers to penetrate into the vicinity of the interface inside the compression rubber layer.

Of the combinations described above, from the viewpoint of improving the noise resistance in pouring water, a combination in which the heat-resistant fibers of the nonwoven fabric (2) are also hydrophilic heat-resistant fibers is preferable, and a combination of laminate nonwoven fabrics of the first nonwoven fabric containing a thermoplastic resin having a softening point or a melting point not higher than the vulcanization temperature and the second nonwoven fabric containing hydrophilic heat-resistant fibers (that is, a combination of the same laminate nonwoven fabrics) is particularly preferable. When the same laminate nonwoven fabrics are used, a laminate having a four-layer structure, such as the nonwoven fabrics (1) to (4), can be easily produced by winding the laminate nonwoven fabrics having a two-layer structure on the unvulcanized rubber sheet for forming the compression rubber layer to be double, with the first nonwoven fabrics arranged on the inner side (the compression rubber layer side).

A schematic view for producing the fiber layer and the fiber/resin mixture layer is shown in (a) and (b) of FIG. 2 using a laminate nonwoven fabric of the first nonwoven fabric containing a thermoplastic resin having a softening point or a melting point not higher than the vulcanization temperature and the second nonwoven fabric containing hydrophilic heat-resistant fibers. By winding laminate nonwoven fabrics, arranged double, including a nonwoven fabric containing a first thermoplastic resin having a softening point or a melting point not higher than the vulcanization temperature and a nonwoven fabric containing the hydrophilic heat-resistant fibers, on the unvulcanized rubber sheet for forming the compression rubber layer, with the first nonwoven fabrics on the inner side, the first nonwoven fabrics and the second nonwoven fabrics are alternately laminated on the unvulcanized rubber sheet. As a result, as shown in (a) of FIG. 2, a laminate having a four-layer structure including a first nonwoven fabric 11a, a second nonwoven fabric 12a, a first nonwoven fabric 11b, and a second nonwoven fabric 12b laminated on the unvulcanized rubber sheet 13 sequentially from the inner side is formed. When the laminate is vulcanized, as shown in (b) of FIG. 2, due to heating and pressurization upon vulcanization, the first nonwoven fabrics 11a and 11b are melted and impregnated into the second nonwoven fabrics 12a and 12b, and a fiber/resin mixture layer 14 made of the hydrophilic heat-resistant fibers and the resin component is formed on a compression rubber layer 16. Specifically, the resin component from both the first nonwoven fabric 11a and the second nonwoven fabric 11b is impregnated into the second nonwoven fabric 12a, and the resin component only from the first nonwoven fabric 11b is impregnated into the second nonwoven fabric 12b. Therefore, the entire region of the second nonwoven fabric 12a and a part of the region (lower region) of the second nonwoven fabric 12b are combined to form the fiber/resin mixture layer 14, and a part of the region (upper region) of the second nonwoven fabric 12b that is not impregnated with the resin component forms the fiber layer 15 made of only the hydrophilic heat-resistant fibers that does not contain a resin component.

The basis weight of the structure for fiber/resin mixture layer and fiber layer (particularly, the laminate nonwoven fabric of the first nonwoven fabric and the second nonwoven fabric) is, for example, from 30 to 180 g/m², preferably from 50 to 150 g/m², and more preferably from 80 to 120 g/m² (especially from 90 to 110 g/m²) or so. If the basis weight is too small, since the rubber penetrates to the surface of the belt, the DRY/WET difference of the coefficient of friction increases, and the noise resistance may be deteriorated, and since the surface layer wears due to running, the noise resistance may be deteriorated. On the other hand, if the basis weight is too large, the flow of the rubber upon vulcanization is inhibited, and shape failure may occur. The ratio of the basis weights of the sheet-like structures is adjusted according to the mass ratio of the resin component to the fiber component.

In the vulcanization molding step, the wound laminate sheet is pressed against a mold to vulcanize and mold at least the unvulcanized rubber sheet of the compression rubber layer. For example, in the case of a V-ribbed belt, an inner mold with a molded body wound therearound is concentrically placed to an outer mold having a pattern of plural ribs marked on the inner periphery thereof. In this stage, a predetermined clearance is provided between the inner periphery of the outer mold and the outer periphery of the molded body. Subsequently, a flexible jacket is expanded toward the inner periphery (pattern of ribs) of the outer mold (e.g., by from 1 to 6% or so) to thereby press the molded body (e.g., an unvulcanized rubber sheet of the fiber/resin mixture layer, the fiber layer, and the compression rubber layer) against the ribs and vulcanize it. Finally, the inner mold is taken out of the outer mold, then the vulcanized rubber sleeve having plural ribs is demolded from the outer mold, and then the vulcanized rubber sleeve is cut with a cutter in a predetermined width in the belt length direction to complete a V-ribbed belt.

In the present invention, it is desirable that, in the vulcanization molding step, the vulcanization is performed after a pre-heated is performed at a temperature lower than the vulcanization temperature. Specifically, it is desirable that the vulcanization process after the flexible jacket has been expanded, includes a first step (for pre-heating treatment) of maintaining at a low temperature (e.g., 60 to 120° C., preferably 65 to 110° C., more preferably 70 to 100° C. or so) for a predetermined period of time (e.g., 2 to 20 minutes, preferably 3 to 15 minutes or so), and a second step of rising the temperature up to the vulcanization temperature (e.g., 150 to 200° C., preferably 160 to 180° C. or so) and keeping as such state for a predetermined period of time (e.g., 10 to 40 minutes, preferably 15 to 30 minutes). Here, a temperature range of from 60 to 120° C. is set for the low temperature, and this is for the purpose of reducing (or lowering) the flowability of the unvulcanized rubber sheet to form the compression rubber layer (especially the surface layer thereof) and the structure for resin component so that a major part of the heat-resistant fibers could be prevented from being taken in the vicinity of the interface inside the compression rubber layer.

By arranging such two temperature steps of the first step (low temperature) and the second step (high temperature) as described above, the surfaces of the ribs can be covered with the fiber layer and the fiber/resin mixture layer and at the same time, a part of the heat-resistant fibers can be embedded in the vicinity of the interface inside the compression rubber layer.

The above-mentioned production method is just one example, and the present invention is not limited to this production method but may be changed and modified variously depending on the materials and the characteristics thereof. For example, the vulcanization process may only include at least the first step and the second step, and may include any other temperature step between the first step and the second step.

Except for the production method, the components and the thickness thereof may be suitably combined, and as the thermoplastic resin constituting the structure for resin component and the rubber composition constituting the unvulcanized rubber sheet of the compression rubber layer, a material having a low flowability may be used.

EXAMPLES

The present invention is described in more detail based on Examples thereof, but the invention is not whatsoever restricted by these Examples. Measurement methods or evaluation methods for physical properties and the raw materials used in the following Examples are shown below.

[Embedded Depth]

A V-ribbed belt was cut in the direction parallel to the belt width direction, and the cut surface (especially the side of rib) was observed (at 50-power magnification) with a scanning electronic microscope (manufactured by JEOL, "JSM5900LV"). The embedded depth of the heat-resistant fibers embedded in the vicinity of the interface to the fiber/resin mixture layer inside the compression rubber layer was measured in the manner as mentioned below.

1) The side of the rib is nearly linear, and therefore, a line A is drawn along the boundary between the fiber/resin mixture layer and the surface layer of the compressive layer (heat-resistant fibers-embedded layer).

2) A vertical line B is drawn from arbitrary 5 points of the groove side of the rib, the tip side of the rib and the area between them (the boundary between the heat-resistant fibers-embedded layer and the inner layer with no embedded therein) toward the line A, and the length of the vertical line B is determined.

3) The values of the length of the vertical line B at 5 points determined in 2) are averaged to be the embedded depth of the heat-resistant fibers.

[Friction Coefficient]

The friction coefficient measurement test was performed by using a tester, of which layout is illustrated in FIG. 3, arranging a drive pulley (Dr.) having a diameter of 121.6 mm, an idler pulley (IDL. 1) having a diameter of 76.2 mm, an idler pulley (IDL. 2) having a diameter of 61.0 mm, an idler pulley (IDL. 3) having a diameter of 76 2 mm, an idler pulley (IDL. 4) having a diameter of 77.0 mm, and a driven pulley (Dn.) having a diameter of 121.6 mm in this order. A V-ribbed belt was hooked on each pulley of the tester. In ordinary running (DRY), the belt was run at room temperature (25° C.), at a drive pulley rotation number of 400 rpm, and at a belt winding angle around the driven pulley of 20°, while given a predetermined load (180 N/6 Rib) applied thereto. The torque of the driven pulley was increased from 0 up to at most 20 Nm, and from the torque value of the driven pulley at the time at which the belt slip velocity to the driven pulley is the highest (100% slip), the friction coefficient μ, was calculated in accordance with the following equation.

$$\mu = \ln(T1/T2)/\alpha$$

Here, T1 is a tension on the tight side, T2 is a tension on the slack side, α is a belt winding angle around the driven pulley, and they can be determined according to the following equations.

$$T1 = T2 + Dn.\text{torque}(\text{kgf·m})/(121.6/2000),$$

$$T2 = 180(N/6\text{Rib}),$$

$$\alpha = \pi/9 (\text{rad}) (\text{in the equation, rad means a radian}).$$

The case of running in pouring water (WET) is the same as ordinary running except that the drive pulley rotation number is 800 rpm, the belt winding angle around the driven pulley was 45° (α=π/4) and 300 ml/min of water was kept applied to the vicinity of the inlet to the driven pulley, as the layout is illustrated in FIG. 4. The friction coefficient μ was determined in the same manner as above, using the above-mentioned equation.

[Noise Generation Limit Angle]

The misalignment noise generation evaluation test (noise generation limit angle) was performed by using a tester, of which layout is illustrated in FIG. 5, arranging a drive pulley (Dr.) having a diameter of 90 mm, an idler pulley (IDL. 1) having a diameter of 70 mm, a misalignment pulley (W/P) having a diameter of 120 mm, a tension pulley (Ten.) having a diameter of 80 mm, an idler pulley (IDL. 2) having a diameter of 70 mm, and an idler pulley (IDL. 3) having a diameter of 80 mm in thin order, in which the axial distance (span length) between the idler pulley (IDL. 1) and the misalignment pulley was set at 135 mm, and all the pulleys were adjusted to be positioned on the same plane (misalignment angle of 0°). A V-ribbed belt was hooked on each pulley of the tester. At room temperature, a tension was applied at drive pulley rotation of 1000 rpm so that the belt tension could be 300 N/6 Rib, and at around the exit of the drive pulley, 5 cc of water was periodically (at intervals of about 30 seconds) poured to the frictional power transmission surface of the V-ribbed belt, and the angle (noise generation limit angle) at which noise would occur (at around the inlet of the misalignment pulley) when the belt was run in misalignment (the misalignment pulley was displaced toward the front side of the drawing relative to each pulley) was determined. Also in ordinary running (in the same layout and under the same running condition as those for running under water pouring except that water was not poured), the noise generation limit angle was determined in the same manner A larger value of noise generation limit angle means excellent noise suppression. When the noise generation limit angle was 2.0° or more in both running in pouring water and ordinary running, the noise suppression was determined as good.

[Wear Rate]

The wear test was performed by using a tester, of which layout is illustrated in FIG. 6, arranging a drive pulley (Dr.) having a diameter of 120 mm, an idler pulley (IDL.) having a diameter of 85 mm, a driven pulley (Dn.) having a diameter of 120 mm, and a tension pulley (Ten.) having a diameter of 60 mm arranged in this order. A V-ribbed belt was hooked on each pulley of the tester. A certain load (91 kg/6 Rib) was applied under the condition that the rotation number of the drive pulley was 4900 rpm, the belt winding angle of the idler pulley and the tension pulley was 90° and the driven pulley load was 10.4 kW, and the belt was run for 24 hours at an ambient temperature of 120° C. The wear rate was determined by dividing the wear volume (=belt mass before running−belt mass after running) by the belt mass before running. A lower value of the wear rate means excellent wear resistance. When the value was 1.4% or less, the wear resistance was determined as good.

[Evaluation of Noise of Actual Vehicle in Pouring Water]

The test vehicle was a commercially available vehicle equipped with a four-cylinder engine with an exhaust amount of 1.5 liters, and the engine oil temperature before the start of measurement was set to not higher than 40° C. First, the V-ribbed belt was attached to the engine at a predetermined tension, then 2 cc of water was poured into the friction power transmission surface of the V-ribbed belt, and finally, the engine was started for five times, and evaluation was performed regarding the following evaluation points, with the lowest evaluation point among the five times of start as the evaluation point of the belt.

(Evaluation Points)

5 . . . without noise generation, allowable

4 . . . with slight noise generation (when the hood is closed, noise cannot be heard even beside the vehicle), allowable 3 . . . with low noise generation (noise cannot be heard at the driver's seat even when the window is open), allowable 2 . . . with medium noise generation (noise can be heard at the driver's seat when the window is open), unallowable 1 . . . with high noise generation (noisy), unallowable

[Durable Running Test]

The durable running test was performed by using a tester, of which layout is illustrated in FIG. 7, arranging a drive pulley (Dr.) having a diameter of 120 mm, an idler pulley (IDL.) having a diameter of 70 mm, a driven pulley (Dn.) having a diameter of 120 mm, and a tension pulley (Ten.) having a diameter of 61 mm arranged in this order. A V-ribbed belt was hooked on each pulley of the tester. A certain load (890 N/6 Rib) was applied under the condition that the rotation number of the drive pulley was 4900 rpm, the belt winding angle of the idler pulley was 120°, the belt winding angle of the tension pulley was 90°, and the driven pulley load was 11.4 kW, and the belt was run for 150 hours at an ambient temperature of 120° C. With respect to the V-ribbed belt after running, the friction coefficient and the noise generation limit angle were measured, and evaluation of noise of the actual vehicle in pouring water was performed.

[Surface Layer Remaining After Running for 150 Hours]

The belt was cut in a direction parallel to the belt width direction before and after the durable running test for 150 hours, and the cut surface was observed by SEM. The thickness of the surface layer (the fiber/resin mixture layer+ the hydrophilic heat-resistant fiber layer) before running and the thickness of the surface layer after running were measured, and the thickness of the surface layer after running/the thickness of the surface layer before running was calculated.

[Resin Components Used in Comparative Examples]

In the comparative examples, the thermoplastic resin to be the resin component in the fiber/resin mixture layer to be arranged on the side of the compression rubber layer is shown in Table 1.

Thermoplastic resin A (manufactured by Tamapoly Co., Ltd., "Multitoron") is a film form of which material is polyethylene (melting point: 130° C.), and has a thickness of 0.04 mm and a basis weight of 38 g/m².

Thermoplastic resin B1 (manufactured by Idemitsu Unitech Co., Ltd., "Stratech") is a nonwoven fabric form formed of long fibers of which material is polyethylene (melting point: 125° C.), and has a thickness of 0.20 mm and a basis weight of 30 g/m².

Thermoplastic resin B2 (manufactured by Idemitsu Unitech Co., Ltd., "Stratech") is a nonwoven fabric form formed of long fibers of which material is polyethylene (melting point: 125° C.), containing 4% by mass of nonionic surfactant kneaded in the fibers, and has a thickness of 0.20 mm and a basis weight of 30 g/m².

Thermoplastic resin C (manufactured by Shinwa Corp, "spun-bond nonwoven fabric") is a nonwoven fabric form formed of composite long fibers of which core material is polypropylene (melting point: 170° C.) and sheath is polyethylene (melting point: 125° C.), and has a thickness of 0.20 mm and a basis weight of 30 g/m².

TABLE 1

| Resin component | A | B1 | B2 | C |
|---|---|---|---|---|
| Material | PE | PE | PE | PP/PE |
| Form | Film | Nonwoven Fabric | Nonwoven Fabric | Nonwoven Fabric |
| Thickness (mm) | 0.04 | 0.20 | 0.20 | 0.20 |
| Melting Point (° C.) | 130 | 125 | 125 | PP 170 PE 125 |
| Basis weight (g/m²) | 38 | 30 | 30 | 30 |
| Type of Fibers | — | Long Fibers | Long Fibers | Long Fibers |

[Nonwoven Fabrics Used in Examples and Comparative Examples]

The nonwoven fabrics used in Examples and Comparative Examples are shown in Table 2. In Comparative Examples, the nonwoven fabrics E to J are nonwoven fabrics arranged on the pulley side with respect to the resin component. The nonwoven fabrics K and L are nonwoven fabrics used in Examples, and the nonwoven fabric M is a nonwoven fabric used in Comparative Examples.

The details of the nonwoven fabrics are as follows, and the properties of the nonwoven fabrics are summarized in Table 2.

Nonwoven fabric E: manufactured by Unitika Ltd., "Cottoace", cotton nonwoven fabric, thickness: 0.15 mm, fiber length: from 5 to 50 mm, basis weight: 30 g/m²

Nonwoven fabric F: manufactured by Unitika Ltd., "Cottoace", cotton nonwoven fabric form, thickness: 0.23 mm, fiber length: from 5 to 50 mm, basis weight: 45 g/m²

Nonwoven fabric G: manufactured by Omikenshi Co., Ltd., "Crabyon", rayon nonwoven fabric, thickness: 0.20 mm, fiber length: from 5 to 50 mm, basis weight: 40 g/m²

Nonwoven fabric H: manufactured by Omikenshi Co., Ltd., "Crabyon", a nonwoven fabric of rayon short fibers having a fiber length of about 50 mm and polyethylene terephthalate (PET) long fibers mixed randomly, rayon short fiber/PET long fibers=70/30 (mass ratio), thickness: 0.21 mm, basis weight: 40 g/m²

Nonwoven fabric I: manufactured by Omikenshi Co., Ltd., "Crabyon", a nonwoven fabric of rayon short fibers having a fiber length of about 50 mm, PET long fibers, and polyethylene (PE) long fibers having a melting point of 125° C. mixed randomly, rayon short fiber/PET long fibers/PE long fibers=70/15/15 (mass ratio), thickness: 0.21 mm, basis weight: 40 g/m$^2$ Nonwoven fabric J: manufactured by Idemitsu Unitech Co., Ltd., "Stramighty", a laminate of a nonwoven paper of pulp having a fiber length of from 2 to 7 mm (thickness 0.25 mm) and a nonwoven fabric of PE long fibers (melting point: 125° C., thickness: 0.10 mm), basis weight: 30 g/m$^2$ Nonwoven fabric K: manufactured by Ozu Corporation, "Noah strong", a laminate of a nonwoven paper of pulp having a fiber length of 10 mm and a nonwoven fabric of polypropylene (PP) long fibers (melting point: 170° C.), basis weight: 80 g/m$^2$ Nonwoven fabric L: manufactured by Ozu Corporation, "Noah strong", a laminate of a nonwoven paper of pulp having a fiber length of 10 mm (thickness: 0.28 mm) and a nonwoven fabric of PP long fibers (melting point: 170° C., thickness: 0.10 mm), basis weight: 100 g/m$^2$ Nonwoven fabric M: manufactured by Ozu Corporation, "Noah strong", a laminate of a nonwoven paper of pulp having a fiber length of 10 mm (thickness: 0.32 mm) and a nonwoven fabric of PP long fibers (melting point: 170° C., thickness: 0.10 mm), basis weight: 200 g/m$^2$ Nonwoven fabric N: manufactured by Ozu Corporation, "Noah strong", a laminate of a nonwoven paper of pulp having a fiber length of 10 mm (thickness: 0.31 mm) and a nonwoven fabric of PP long fibers (melting point: 170° C., thickness: 0.07 mm), basis weight: 100 g/m$^2$ Nonwoven fabric O: manufactured by Ozu Corporation, "Noah strong", a laminate of a nonwoven paper of pulp having a fiber length of 10 mm (thickness: 0.20 mm) and a nonwoven fabric of PP long fibers (melting point: 170° C., thickness: 0.17 mm), basis weight: 100 g/m$^2$

TABLE 2

| Nonwoven fabric | E | F | G | H | I | J | |
|---|---|---|---|---|---|---|---|
| Material | Cotton | Cotton | Rayon | Rayon/PET | Rayon/PET/PE | Pulp PE | |
| Form | Nonwoven fabric | Nonwoven fabric | Nonwoven fabric | Nonwoven fabric | Nonwoven fabric | Pulp | Nonwoven paper |
| | | | | | | PE | Nonwoven fabric |
| Thickness (mm) | 0.15 | 0.23 | 0.20 | 0.21 | 0.21 | Pulp | 0.25 |
| | | | | | | PE | 0.10 |
| Weight ratio | — | — | — | 70/30 | 70/15/15 | 60/40 | |
| Resin melting point (° C.) | — | — | — | — | 125 | 125 | |
| Fiber length (mm) | 5 to 50 | 5 to 50 | 5 to 50 | Rayon: about 50; PET: long fibers | Rayon: about 50; PET: long fibers; PE: long fibers | Pulp: 2 to 7; PE: long fibers | |
| Basis weight (g/m$^2$) | 30 | 45 | 40 | 40 | 40 | 30 | |

| Nonwoven fabric | K | | L | | M | | N | | O | |
|---|---|---|---|---|---|---|---|---|---|---|
| Material | Pulp PP | | Pulp PP | | Pulp PP | | Pulp PP | | Pulp PP | |
| Form | Pulp | Nonwoven paper | Pulp | Nonwoven paper | Pulp | Nonwoven paper | Pulp | Nonwoven paper | Pulp | Nonwoven paper |
| | PP | Nonwoven fabric | PP | Nonwoven fabric | PP | Nonwoven fabric | PP | Nonwoven fabric | PP | Nonwoven fabric |
| Thickness (mm) | Pulp | 0.27 | Pulp | 0.28 | Pulp | 0.32 | Pulp | 0.31 | Pulp | 0.20 |
| | PP | 0.10 | PP | 0.10 | PP | 0.10 | PP | 0.07 | PP | 0.17 |
| Weight ratio | 70/30 | | 70/30 | | 70/30 | | 80/20 | | 50/50 | |
| Resin melting point (° C.) | 170 | | 170 | | 170 | | 170 | | 170 | |
| Fiber length (mm) | Pulp: 10; PP: long fibers | | Pulp: 10; PP: long fibers | | Pulp: 10; PP: long fibers | | Pulp: 10; PP: long fibers | | Pulp: 10; PP: long fibers | |
| Basis weight (g/m$^2$) | 80 | | 100 | | 200 | | 100 | | 100 | |

[Raw Materials of Compression Rubber Layer, Tension Layer, and Tension Member]

EPDM polymer: manufactured by DuPont Dow Elastomer Japan, "IP3640"

Carbon black HAF: "SEAST 3" manufactured by Tokai Carbon Co., Ltd.

Anti-aging agent: "NONFLEX OD3" manufactured by Seiko Chemical Co., Ltd.

Nylon short fibers: Nylon 66; fiber length, about 0.5 mm

Organic peroxides: "Perkadox 14RP" manufactured by Kayaku Akzo Co., Ltd.

Tension member: Twist cords produced by plying 1,000-denier PET fibers in a twisting mode of 2×3 at a final twist coefficient of 3.0 and a primary twist coefficient of 3.0, and subjecting the obtained cord having a total denier of 6,000 to adhesion treatment.

Examples 1 to 2 and Comparative Examples 1 to 12

(Formation of Compression Rubber Layer and Tension Layer)

The rubber composition shown in Table 3 was kneaded with a Banbury mixer, and rolled with a calender roll to form a rubber sheet for forming a compression rubber layer or a tension layer, each having a thickness of 2.5 mm or 0.8 mm, respectively.

TABLE 3

| Material | Rubber for Compression rubber layer | Rubber for Tension layer |
| --- | --- | --- |
| EPDM Polymer | 100 | 100 |
| Zinc Oxide | 5 | 5 |
| Stearic Acid | 1 | 1 |
| Carbon Black HAF | 80 | 80 |
| Paraffinic Oil | 15 | 15 |
| Anti-aging Agent | 2 | 2 |
| Organic Peroxide | 5 | 5 |
| Nylon Short Fibers | 0 | 15 |
| Total | 208 | 223 |

(Production of Belt)

The unvulcanized sheet for tension layer was wound around an inner mold equipped with a flexible jacket around the outer periphery thereof, then a tension member was helically spun thereover (at a pitch of 1.15 mm, and under a tension of 5 kgf), and further the unvulcanized sheet for compression rubber layer and a structure for fiber layer and fiber/resin mixture layer were sequentially wound therearound to produce a belt. In Examples 1 to 4, the structure (the nonwoven fabric K, L, N, or O) was wound for two rounds, and in the Comparative Examples, the structure was wound for one round. Vulcanization was performed by keeping the expansion pressure of the flexible jacket at 1.0 MPa, then keeping it as such at a temperature of 80° C. for a time of 10 minutes (first step), and thereafter heating it up to a temperature of 170° C. and keeping it at the temperature for 20 minutes (second step). After the vulcanization, this was cooled to around room temperature, and the outer mold was taken out of the inner mold, and thereafter the vulcanized belt sleeve was demolded from the outer mold.

As the structure for fiber layer and fiber/resin mixture layer, the resin component in Table 1 and the nonwoven fabric in Table 2 were respectively combined to prepare 16 types of belts as shown in Tables 4 and 5. In Examples 1 to 4, PP nonwoven fabrics of the nonwoven fabrics K, L, N, and O in Table 2 were arranged on the side of the compression rubber layer (and the nonwoven pulp paper was arranged on the side of pulleys), and were wound for two rounds. In Comparative Examples 1 to 7 and 9, the resin component in Table 1 was arranged on the side of the compression rubber layer, and the nonwoven fabric in Table 2 was arranged thereon (on the side of pulleys), and was wound for one round. In Comparative Example 8, a PE nonwoven fabric of the nonwoven fabric J in Table 2 was arranged on the side of the compression rubber layer (and the nonwoven pulp paper was arranged on the side of pulleys), and was wound for one round. In Comparative Examples 10 to 12, PP nonwoven fabrics of the nonwoven fabrics K, L, and M in Table 2 was arranged on the side of the compression rubber layer (and the nonwoven pulp paper was arranged on the side of pulleys), and were wound for one round. The V-ribbed belts produced here were 6-rib belts having a belt length of 1,100 mm and having a K-type rib form.

With respect to the obtained V-ribbed belts, as the results of comparison of the materials of the fiber layer and the fiber/resin mixture layer, the evaluation results of the belts obtained in Examples 1 to 4 and Comparative Examples 1 to 9 are shown in Table 4, and with respect to the belts obtained in Examples 1, 2 and Comparative Examples 10 to 12, the results of comparison of the structures of the fiber layer and the fiber/resin mixture layer are shown in Table 5.

TABLE 4

| | Example | | | | Comparative Example | | | | | | | | |
| --- | --- | --- | --- | --- | --- | --- | --- | --- | --- | --- | --- | --- | --- |
| | 1 | 2 | 3 | 4 | 1 | 2 | 3 | 4 | 5 | 6 | 7 | 8 | 9 |
| Resin component | K | L | N | O | A | B1 | A | C | B1 | B1 | B1 | J | B2 |
| Nonwoven fabric containing heat-resistant fibers | | | | | E | E | F | F | G | H | I | | E |
| Weight ratio (resin component/heat-resistant fibers) | 30/70 | 30/70 | 20/80 | 50/50 | 56/44 | 50/50 | 46/54 | 40/60 | 43/57 | 43/57 | 50/50 | 40/60 | 50/50 |
| Embedded depth (μm) | 75 | 75 | 75 | 75 | 40 | 35 | 50 | 40 | 30 | 35 | 25 | 20 | 20 |

TABLE 4-continued

| | | Example | | | | Comparative Example | | | | | | | | |
|---|---|---|---|---|---|---|---|---|---|---|---|---|---|---|
| | | 1 | 2 | 3 | 4 | 1 | 2 | 3 | 4 | 5 | 6 | 7 | 8 | 9 |
| Friction coefficient | DRY | 1.00 | 1.00 | 1.00 | 1.00 | 1.20 | 1.25 | 1.30 | 1.20 | 1.20 | 1.30 | 1.20 | 1.20 | 1.20 |
| | WET | 1.00 | 1.00 | 1.00 | 0.90 | 0.70 | 0.75 | 0.80 | 0.60 | 0.60 | 0.60 | 0.75 | 0.80 | 0.80 |
| | DRY/WET difference | 0.00 | 0.00 | 0.00 | 0.10 | 0.50 | 0.50 | 0.50 | 0.60 | 0.60 | 0.70 | 0.45 | 0.40 | 0.40 |
| Noise generation limit angle (°) | DRY | Rib misalignment | Rib misalignment | Rib misalignment | Rib misalignment | Rib misalignment | Rib misalignment | Rib misalignment | Rib misalignment | Rib misalignment | Rib misalignment | Rib misalignment | Rib misalignment | Rib misalignment |
| | WET | Rib misalignment | Rib misalignment | Rib misalignment | Rib misalignment | 2.4 | 3.0 | 2.8 | 2.8 | 2.7 | 2.5 | Rib misalignment | Rib misalignment | Rib misalignment |
| Wear rate (%) | | 1.0 | 1.0 | 1.0 | 0.9 | 1.1 | 1.3 | 1.3 | 1.1 | 1.3 | 0.9 | 1.2 | 1.0 | 1.1 |
| Evaluation of noise of actual vehicle in pouring water | | 5 | 5 | 5 | 5 | 3 | 3 | 3 | 3 | 2 | 2 | 2 | 3 | 3 |

According to the results of Table 4, Comparative Examples 1 to 9 had the frictional power transmission face coated with the fiber/resin mixture layer, and thus had excellent noise resistance upon misalignment, but had lower evaluation points of 2 to 3 in evaluation of noise of the actual vehicle in pouring water. The reason for this is considered as a larger difference between friction coefficients of DRY and WET. In Comparative Examples 1 to 9, since a resin component having low hydrophilicity covers most of the frictional power transmission surface, it is considered that the difference between friction coefficients of DRY and WET was larger.

On the other hand, Examples 1 to 4 have a structure in which the frictional power transmission face is covered with a hydrophilic heat-resistant fiber layer. According to this structure, in pouring water, the hydrophilic heat-resistant fiber layer rapidly absorbs water that has entered between the belt and the pulleys, and water film is not formed between the belt and the pulleys. Therefore, there is no difference between the friction coefficients of DRY and WET, and a high evaluation point 5 was exhibited in evaluation of noise of the actual vehicle in pouring water. Thereby, it was confirmed that by providing the fiber layer on the fiber/resin mixture layer, there was no difference between friction coefficients of DRY and WET, and the noise resistance was improved significantly. The belt obtained in Example 4, probably because of having more resin component and less small heat-resistant fibers, had a slight lower friction coefficient of WET as compared with Examples 1 to 3, but had no difference in evaluation of noise of the actual vehicle in pouring water, and was of a level with no problem in practical use.

TABLE 5

| | Example | | Comparative Example | | |
|---|---|---|---|---|---|
| | 1 | 2 | 10 | 11 | 12 |
| Nonwoven fabric containing heat-resistant fibers | K | L | K | L | M |
| Weight per piece of nonwoven fabric (g/m²) | 80 | 100 | 80 | 100 | 200 |
| Times of winding | 2 | 2 | 1 | 1 | 1 |
| Friction coefficient DRY | 1.00 | 1.00 | 0.91 | 1.03 | Shape failure |
| Friction coefficient WET | 1.00 | 1.00 | 0.91 | 1.03 | |
| DRY/WET difference | 0.00 | 0.00 | 0.00 | 0.00 | |
| Noise generation limit angle (°) DRY | Rib misalignment | Rib misalignment | Rib misalignment | Rib misalignment | |
| Noise generation limit angle (°) WET | Rib misalignment | Rib misalignment | Rib misalignment | Rib misalignment | |
| Wear rate (%) | 1.0 | 1.0 | 1.0 | 1.0 | |
| Evaluation of noise of the actual vehicle in pouring water | 5 | 5 | 5 | 5 | |
| Surface layer remaining after 150 hours of duration (%) | 50 | 60 | 0 | 20 | |
| Friction coefficient after duration DRY | 1.10 | 1.10 | 1.60 | 1.40 | |
| Friction coefficient after duration WET | 0.80 | 0.90 | 0.40 | 0.60 | |
| DRY/WET difference | 0.30 | 0.20 | 1.20 | 0.80 | |
| Noise generation limit angle after duration (°) DRY | 3.5 | Rib misalignment | 2.0 | 2.0 | |
| Noise generation limit angle after duration (°) WET | 2.5 | 3 | 1.0 | 1.0 | |
| Evaluation of noise of the actual vehicle in pouring water after duration | 3 | 4 | 1 | 2 | |

As is clear from the results of Table 5, Comparative Example 12 is an example in which the basis weight of the nonwoven fabric was as large as 200 g/m², but had shape failure probably because that the flow of the rubber upon vulcanization was inhibited.

In both Examples 1 and 2 and Comparative Examples 10 and 11, no noise was generated until rib misalignment in the misalignment noise generation evaluation test at the time of new product (before durable running), and a good result of an evaluation point of 5 was exhibited in evaluation of noise of the actual vehicle in pouring water. However, a difference in the noise resistance after the durable running test between Examples and Comparative Examples was observed.

In Examples 1 and 2, even after the durable running test, the difference between friction coefficients of DRY and WET was maintained at a small difference not higher than 0.3, whereas in Comparative Examples 10 and 11, the difference was considerably higher. Further, in the misalignment noise generation evaluation test, Examples 1 and 2 exhibited a good level of the noise generation limit angle not lower than 2°, whereas in Comparative Examples 10 and 11, noise generation was observed when the noise generation limit angle of WET was 1°, which is a misalignment amount that may occur on an actual vehicle. Further, in evaluation of noise of the actual vehicle in pouring water after the durable running test, Example 1 and Example 2 exhibited evaluation points not lower than 3, which are of an acceptable level, whereas Comparative Examples 10 and 11 exhibited evaluation points of 1 and 2, which are of an unacceptable level.

FIG. 8 shows a scanning electromicroscopic picture of a rib cross section of the V-ribbed belt obtained in Example 2. As is clear from FIG. 8, in the rib cross section of the belt of Example 2, the heat-resistant fibers of the fiber/resin mixture layer were embedded in the vicinity of the surface to the compression rubber layer, and a fiber/resin mixture layer and a fiber layer were formed above the heat-resistant fibers. On the other hand, in the rib cross section of the V-ribbed belt obtained in Comparative Examples 10 and 11, only a fiber/resin mixture layer in which the resin component and the heat-resistant fiber were integrated was formed, and the fiber layer was not formed.

While the present invention has been described in detail and with reference to specific embodiments thereof, it will be apparent to one skilled in the art that various changes and modifications can be made therein without departing from the spirit and scope thereof.

This application is based on Japanese Patent Application No. 2017-054859 filed on Mar. 21, 2017 and Japanese Patent Application No. 2018-041186 filed on Mar. 7, 2018, the entire subject matter of which is incorporated herein by reference.

INDUSTRIAL APPLICABILITY

The frictional power transmission belt of the present invention can be utilized for various types of frictional power transmission belts, for example, V-ribbed belts, raw-edge V-belts, flat belts, etc., and is especially useful for V-ribbed belts, V-belts and others for use for driving automobile engine auxiliary machines.

REFERENCE SIGNS LIST

1 Tension Member
2 Compression rubber layer
3 Ribs
4 Short Fibers
5 Tension layer
6 Adhesive Layer

The invention claimed is:

1. A production method for a frictional power transmission belt, the method comprising:
   a winding step of sequentially winding, around a cylindrical drum, a sheet for forming a tension layer, a tension member, an unvulcanized rubber sheet for forming a compression rubber layer, and a sheet structure for forming a fiber/resin mixture layer and a fiber layer, wherein the winding step results in a multilayer material; and
   a vulcanization molding step of pressing the multilayer material against a mold to vulcanize and mold the unvulcanized rubber sheet,
   wherein, in the vulcanization molding step, the unvulcanized rubber sheet is pre-heated, at a temperature lower than a vulcanization temperature of the unvulcanized rubber sheet, and then vulcanized, and
   wherein the winding step, when winding the sheet structure, comprises:
      winding a first nonwoven fabric comprising a first thermoplastic resin having a
   softening point or a melting point not higher than the vulcanization temperature;
      winding a second nonwoven fabric comprising heat-resistant fibers;
      winding a third nonwoven fabric comprising a second thermoplastic resin having a softening point or a melting point not higher than the vulcanization temperature; and
      winding a fourth nonwoven fabric comprising hydrophilic heat-resistant fibers.

2. The production method according to claim 1, wherein the sheet structure has a basis weight of from 50 to 150 g/m².

* * * * *